US011687070B2

(12) United States Patent
Chandrashekar et al.

(10) Patent No.: US 11,687,070 B2
(45) Date of Patent: Jun. 27, 2023

(54) SYSTEM AND METHOD FOR PREDICTING SHOCK ABSORBER LIFESPAN

(71) Applicant: Ace Controls Inc., Farmington Hills, MI (US)

(72) Inventors: Rahul Chandrashekar, Farmington, MI (US); Christopher M. Niemiec, Livonia, MI (US); Scott W. McNeil, Ann Arbor, MI (US)

(73) Assignee: Ace Controls Inc., Farmington Hills, MI (US)

(*) Notice: Subject to any disclaimer, the term of this patent is extended or adjusted under 35 U.S.C. 154(b) by 0 days.

(21) Appl. No.: 17/400,591

(22) Filed: Aug. 12, 2021

(65) Prior Publication Data

US 2022/0050450 A1 Feb. 17, 2022

Related U.S. Application Data

(60) Provisional application No. 63/064,612, filed on Aug. 12, 2020.

(51) Int. Cl.
*G05B 23/02* (2006.01)
*F16F 9/32* (2006.01)
*G06N 20/00* (2019.01)

(52) U.S. Cl.
CPC ........ *G05B 23/0283* (2013.01); *F16F 9/3292* (2013.01); *G06N 20/00* (2019.01)

(58) Field of Classification Search
CPC .... G05B 23/0283; F16F 9/3292; G06N 20/00
See application file for complete search history.

(56) References Cited

U.S. PATENT DOCUMENTS

| | | | |
|---|---|---|---|
| 3,548,573 A | 12/1970 | Krehbiel | |
| 3,581,836 A | 6/1971 | Segerdahl | |
| 4,907,760 A | 3/1990 | Sealey et al. | |
| 5,094,407 A | 3/1992 | Jampy et al. | |
| 5,707,045 A | 1/1998 | Easter | |
| 8,275,515 B2 | 9/2012 | Wright et al. | |
| 8,335,608 B2 | 12/2012 | Mitchell et al. | |
| 8,671,099 B2 | 3/2014 | Kapoor et al. | |
| 9,098,951 B2 | 8/2015 | Nieten et al. | |
| 9,522,741 B2 | 12/2016 | Piroozmandi | |
| 10,269,188 B2 | 4/2019 | Fazeli et al. | |
| 2002/0035423 A1 | 3/2002 | Shank et al. | |
| 2009/0099719 A1 | 4/2009 | Namudur et al. | |
| 2009/0287371 A1 | 11/2009 | Wright et al. | |

(Continued)

OTHER PUBLICATIONS

Ventura, P.J.C. et al., "An embedded system to assess the automotive shock absorber condition under vehicle operation," Sensors, 2008 IEEE, Lecce, Italy, Nov. 2008, pp. 1210-1213, doi: 10.1109/ICSENS.2008.4716660.

(Continued)

*Primary Examiner* — Manuel L Barbee
(74) *Attorney, Agent, or Firm* — Price Heneveld LLP

(57) ABSTRACT

A shock absorber system may include at least one sensor that is configured to measure an operating parameter of the shock absorber during operation of the shock. The system may be configured to determine Time-Through-Stroke (TTS) and/or Rod Return Time (RRT) utilizing data from the sensor or sensors. The system may be configured to utilize machine learning to detect and/or predict a failure of the shock absorber.

24 Claims, 19 Drawing Sheets

(56) References Cited

U.S. PATENT DOCUMENTS

| | | |
|---|---|---|
| 2014/0238797 A1 | 8/2014 | Blankenship et al. |
| 2014/0312171 A1 | 10/2014 | Schmidt |
| 2015/0267769 A1 | 9/2015 | Fazeli et al. |
| 2017/0166329 A1 | 6/2017 | Fazeli et al. |
| 2019/0178327 A1* | 6/2019 | Kunkel ............... F16F 9/3264 |
| 2019/0353561 A1* | 11/2019 | Landolsi ............ B60G 17/0195 |
| 2020/0011394 A1 | 1/2020 | Nardemann et al. |
| 2020/0025274 A1* | 1/2020 | Anderson ............ F16F 9/3264 |

OTHER PUBLICATIONS

Howard, Carl Q. et al., "Monitoring the Age of Vehicle Shock Absorbers," Research Paper, International Conference on Science and Innovation for Land Power 2018 (ICSILP), Sep. 2018, 5 pages.

Cauley, "Next Generation Shock Absorber Technology and Innovation" Webinar Presentation, ITT Enidine Presentation, Sentinel Adaptable Technologies 4.0 Series, Dec. 12, 2019 (11 pages).

\* cited by examiner

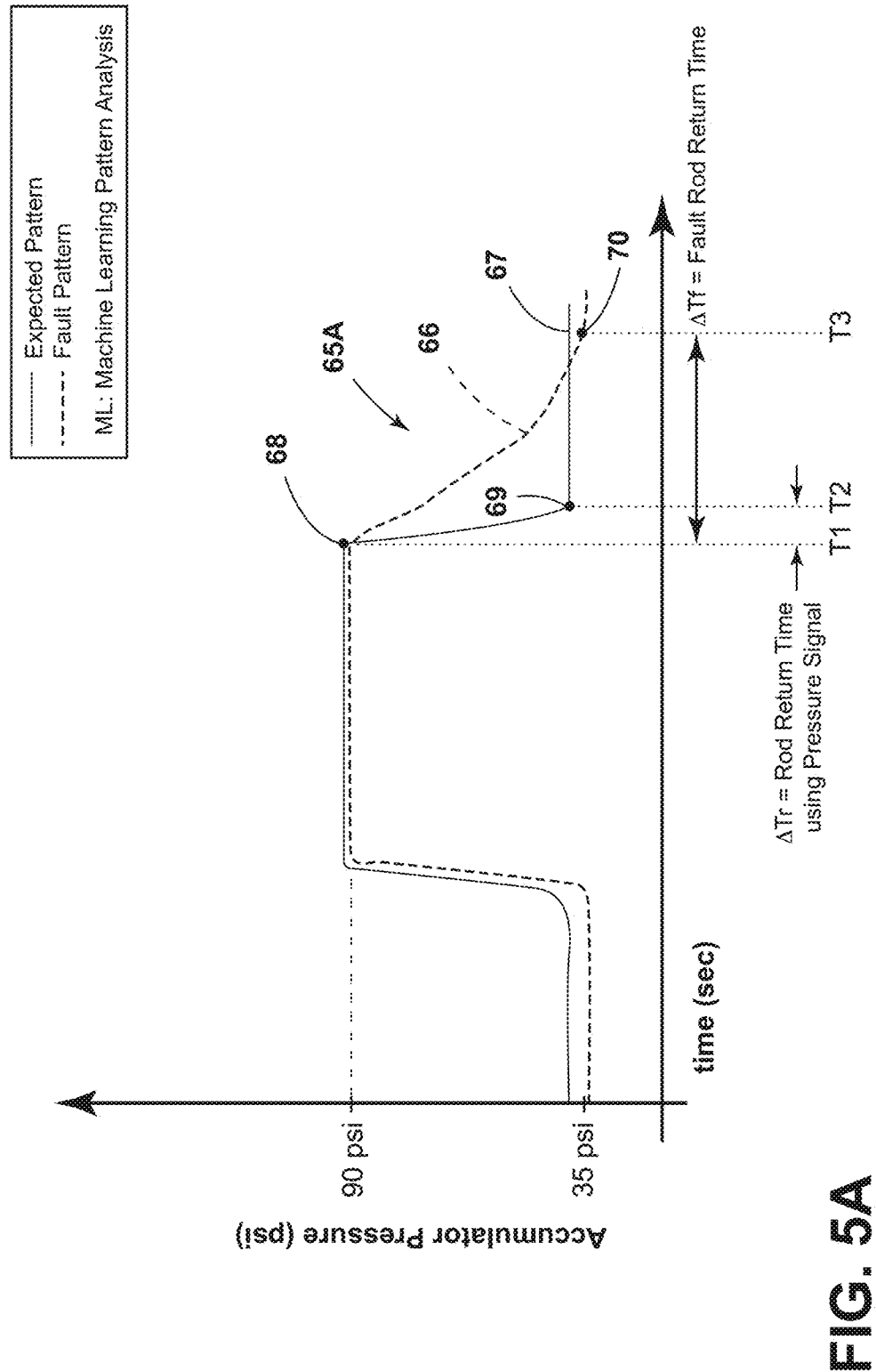

SYSTEM AND METHOD FOR PREDICTING SHOCK ABSORBER LIFESPAN

CROSS-REFERENCE TO RELATED APPLICATION

This application claims the benefit under 35 U.S.C. § 119(e) to U.S. Provisional Patent Application No. 63/064,612, filed Aug. 12, 2020, entitled "SYSTEM AND METHOD FOR PREDICTING SHOCK ABSORBER LIFESPAN," the entire contents of which is incorporated herein by reference.

BACKGROUND OF THE INVENTION

Various energy-absorbing mechanisms (e.g. shock absorbers) for decelerating moving objects have been developed. Shock absorbers may be used in a wide variety of applications.

SUMMARY OF THE INVENTION

An aspect of the present invention is an industrial shock absorber system. The system includes an industrial shock absorber having a body and a force-receiving member (optionally a piston rod) movably connected to the body whereby a force applied to the force-receiving member causing movement of the force-receiving member relative to the body from an extended position to a retracted position. The time required for the force-receiving member to move from the extended position to the retracted position comprises a Time-Through-Stroke (TTS). The movement of the force-receiving member causes movement of a working fluid whereby the working fluid resists movement of the force-receiving member as the force-receiving member moves from the extended position to a retracted position when a force is applied to the force-receiving member. The system also includes a resilient member (optionally a spring) biasing the force-receiving member towards the extended position such that the force-receiving member returns to the extended position if a force applied to the force-receiving member is released. The time required for the force-receiving member to return to the extended position from the retracted position comprises a Rod Return Time (RRT). The system further includes a sensor that is configured to generate measured sensor data corresponding to at least one of a pressure of the working fluid, a temperature of the working fluid, and rod position data corresponding to a position of the force-receiving member relative to the body. The system further includes at least one computing device that is operably coupled to the sensor. The computing device is configured to determine at least one of TTS and RRT based on the sensor data. The at least one computing device is further configured to compare measured TTS and/or measured RRT to expected and/or historical TTS and/RRT data to detect and/or predict failure of the industrial shock absorber.

The system is optionally configured to perform machine learning on real-time sensor data and to compare the real-time sensor data with historical sensor data to identify anomalies and/or outliers and/or to predict shock absorber failure by comparing the real-time sensor data with patterns from historical data and/or models.

The measured sensor data may optionally form a pattern, and the system may optionally store sensor data for a plurality of cycles. The computing device is optionally configured to compare stored sensor data to measured sensor data and to utilize machine learning to detect and/or predict failure of the shock absorber based, at least in part, on changes in the patterns formed by the sensor data over time.

The system is optionally configured to immediately detect fault and/or failures by comparing the measured sensor data to expected sensor data, and to communicate the faults and/or failures to an operator of the system.

The system may be configured such that the force-receiving member defines a cycle each time the force-receiving member moves from the extended position to a retracted position followed by movement of the force-receiving member from the retracted position to the extended position. The computing device is optionally configured to determine a number of cycles that have occurred during a predefined time interval utilizing pressure data from the sensor.

The computing device is optionally configured to determine TTS and/or RRT using only pressure data. Alternatively, the computing device is optionally configured to determine TTS and/or RRT using rod position data and measured pressure data.

The system optionally includes a Rod-IN proximity switch that generates a signal when the force-receiving member is in the retracted position. The system optionally includes a Rod-OUT proximity switch that generates a signal when the force-receiving member is in the extended position. The computing device is optionally configured to determine TTS and/or RRT using data from the Rod-IN and Rod-OUT proximity switches.

The system is optionally configured to monitor TTS and/or RRT and to provide a failure notification if the magnitude of the TTS and/or RRT is not within a predefined acceptable range.

The system is optionally configured to provide a notification if the system determines that deviations from a predicted outcome have occurred.

The industrial shock absorber optionally includes a main internal chamber in the body and a secondary chamber in an external accumulator that is fluidly connected to the main internal chamber. The sensor optionally comprises a pressure sensor that is configured to measure pressure of working fluid in the secondary chamber. During a cycle, the pressure of the working fluid in the secondary chamber may have an initial pressure, increase to a maximum pressure, and decrease to a final pressure that is substantially equal to the initial pressure to thereby define a pressure pattern. The computing device is optionally configured to repeatedly store pressure data corresponding to the pressure of working fluid in the secondary chamber measured by the sensor during a plurality of cycles, and to determine if changes in the pressure patterns indicate that a failure has occurred and/or is likely to occur within a predefined number of cycles at substantially the same applied force.

Another aspect of the present disclosure is a method of monitoring operation of an industrial shock absorber in use (e.g., when the industrial shock absorber is installed in a machine whereby the industrial shock absorber is repeatedly subject to a force over a period of time). The method includes repeatedly measuring an operating parameter of an industrial shock absorber using a sensor as the industrial shock absorber is cycled by repeatedly applying a force having a substantially uniform magnitude each time the force is applied to the industrial shock absorber, whereby the sensor generates operating parameter data. The method includes storing operating parameter data for a plurality of cycles to form historical operating parameter data. A computing device is utilized to perform machine learning on the operating parameter data for a plurality of cycles, and to compare more recent operating parameter data to the historical operating parameter data, whereby the computing device predicts failure (e.g., a number of cycles to failure) of the industrial shock absorber based on changes in the operating parameter data over time. The failure may comprise a predefined change in the resistance force of the industrial shock absorber sufficient to render the industrial shock absorber unsuitable for the application (e.g., a specific machine in which the industrial shock absorber is installed).

The industrial shock absorber optionally includes a body and a piston rod that moves relative to the body between extended and retracted positions. The piston rod may act on the working fluid, such that the working fluid is pressurized as the piston rod moves from the extended position to the retracted position. The industrial shock absorber may further include a spring biasing piston rod towards the extended position from the retracted position to cause the piston rod to move from the retracted position to the extended position if no force is applied to the piston rod. The operating parameter data may, optionally, include pressure of the working fluid as the piston rod moves from the extended position to the retracted position. The computing device is optionally used to detect changes in patterns formed by the pressure of the working fluid as the piston rod moves from the extended position to the retracted position over time, and to predict failure (e.g., a number of cycles remaining before failure) of the industrial shock absorber. The predicted failure may assume that a cyclical force having substantially the same magnitude during each cycle is repeatedly applied to the industrial shock absorber.

The pressure of the working fluid as the piston rod moves from the extended position to the retracted position may increase from a baseline pressure to a peak pressure, then decrease from the peak pressure back to the baseline pressure. The method optionally includes causing the computing device to predict and/or detect a failure of the industrial shock absorber based on changes over time and at least one of the baseline pressure, the peak pressure, and changes in pressure between the baseline pressure and the peak pressure.

The method optionally includes causing the computing device to repeatedly determine at least one of a Time-Through-Stroke (TTS) comprising a time required for the piston rod to move from the extended position to the retracted position when the cyclical force is applied, and a Rod Return Time (RRT) comprising a time required for the piston rod to move from the retracted position to the extended position after the cyclical force is removed. The method may include causing the computing device to detect failure of the industrial shock and/or predict failure of the industrial shock based on changes in TTS and/or RRT over time.

Optionally, at least one of the TTS and RRT may be determined using measured pressure data.

Optionally, at least one of the TTS and RRT may be determined using a sensor that is configured to detect at least one of a position and an acceleration of the piston rod relative to the body.

The pressure of the working fluid as the piston rod moves from the extended position to the retracted position may optionally comprise a fluid pressure in an external accumulator of the industrial shock absorber. During each cycle prior to failure, the peak pressure of the pressure of the working fluid as the piston rod moves from the extended position to the retracted position may be substantially constant for a period of time, and then begin to drop from the peak pressure at a first transition point, and continue to drop until the pressure of the working fluid (as the piston rod moves from the extended position to the retracted position) reaches a second transition point at which the pressure of the working fluid (as the piston rod moves from the extended position to the retracted position) substantially returns to the baseline pressure. An amount of time between the first and second transition points may increase over time. The computing device may be configured to detect and/or predict failure of the industrial shock absorber based, at least in part, on an increase over a plurality of cycles in the amount of time between the first and second transition points during individual cycles.

The historical operating parameter data for each cycle may form a pattern, and the patterns for each cycle may change over time. The method optionally includes causing the computing device to generate a warning if the computing device determines that changes in the patterns indicate that the industrial shock absorber has failed, or that the industrial shock absorber will fail if the cyclical load continues to be applied.

The method optionally includes providing expected operating parameter data to the computing device, and causes the computing device to generate a failure warning if the measured operating parameter data does not meet predefined matching criteria when compared to the expected operating parameter data.

BRIEF DESCRIPTION OF THE DRAWINGS

In the drawings:

FIG. 5A is a graph showing Rod Return Time (RRT) calculation according to another aspect of the present disclosure;

DETAILED DESCRIPTION

Figure 1:
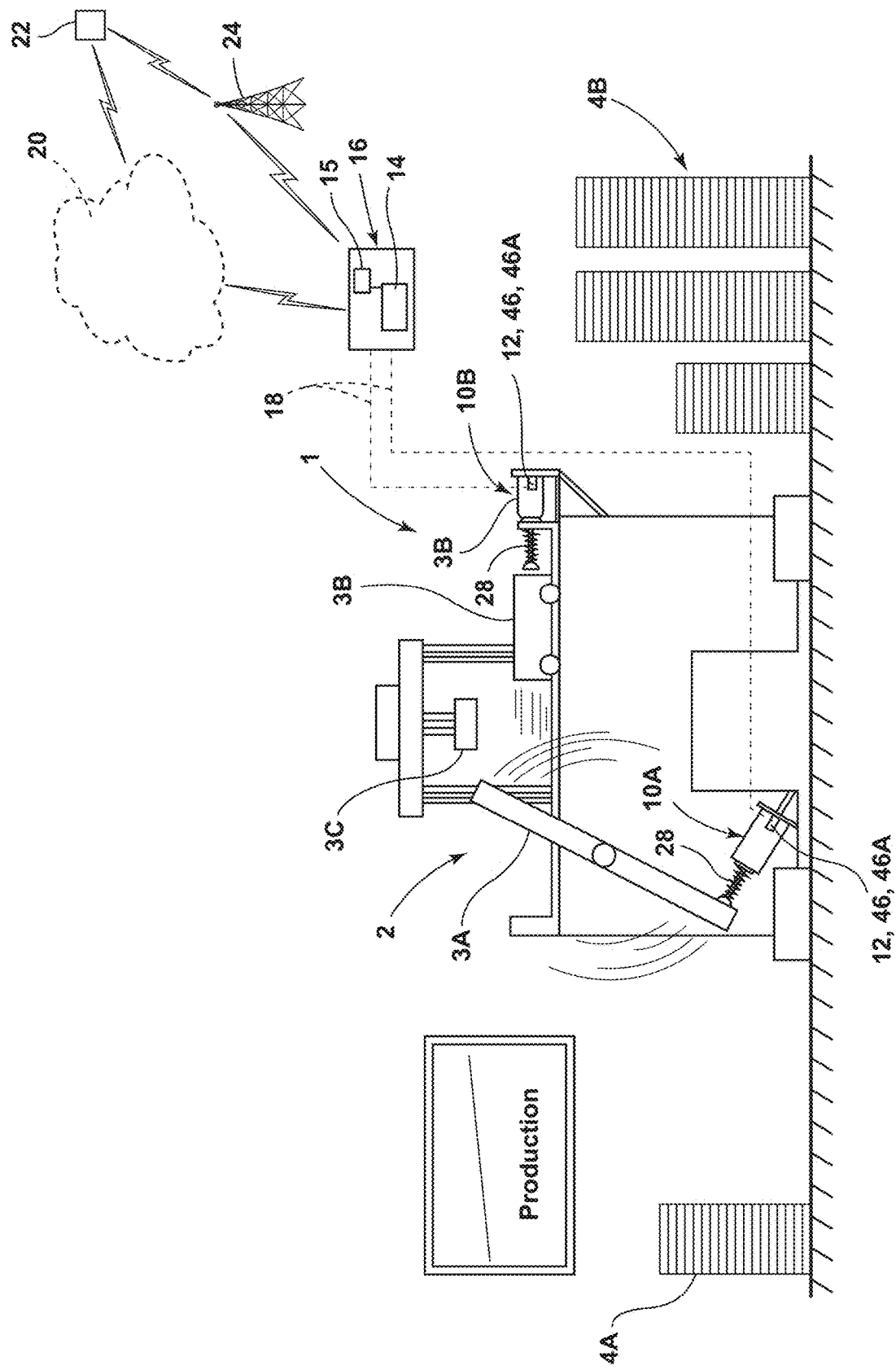
FIG. 1 is a schematic side elevational view of a system according to one aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present disclosure generally relates to industrial shock absorbers that may be utilized to decelerate a moving object. Industrial shock absorbers may utilized in a wide variety of applications such as in steel mills, lumber mills, shipping yards, warehouses, stacker spaces, automated storage and retrieval systems, production machinery, etc. For example, with reference to FIG. 1, system 1 may comprise a production system 1 or other industrial system, and may include machinery 2 including a stationary base and one or more moving components 3A, 3B, etc. that are decelerated by one or more industrial shock absorbers or shocks 10A, 10B having piston rods 28. In the illustrated example of FIG. 1, the machinery 2 converts raw materials 4A into finished products 4B. However, it will be understood that the present disclosure is not limited to any specific type of machinery or application. Shocks 10A and 10B may be substantially similar to the industrial shock absorbers 10 and associated monitoring system described in more detail below. In particular, shocks 10A and 10B may include one or more sensors 12, 46, 46A that are utilized to predict end-of-life and/or to detect failure and/or excessive wear. Sensors 12 may comprise pressure and/or temperature sensors, and sensors 46, 46A may comprise position sensors that provide signals concerning the positions (e.g. Rod-IN and/or Rod-OUT) of piston rods 28. Shocks 10A and 10B may also be operably connected to one or more remote devices or stations 16 that may be utilized to monitor shocks 10A and 10B.

Figure 1A:
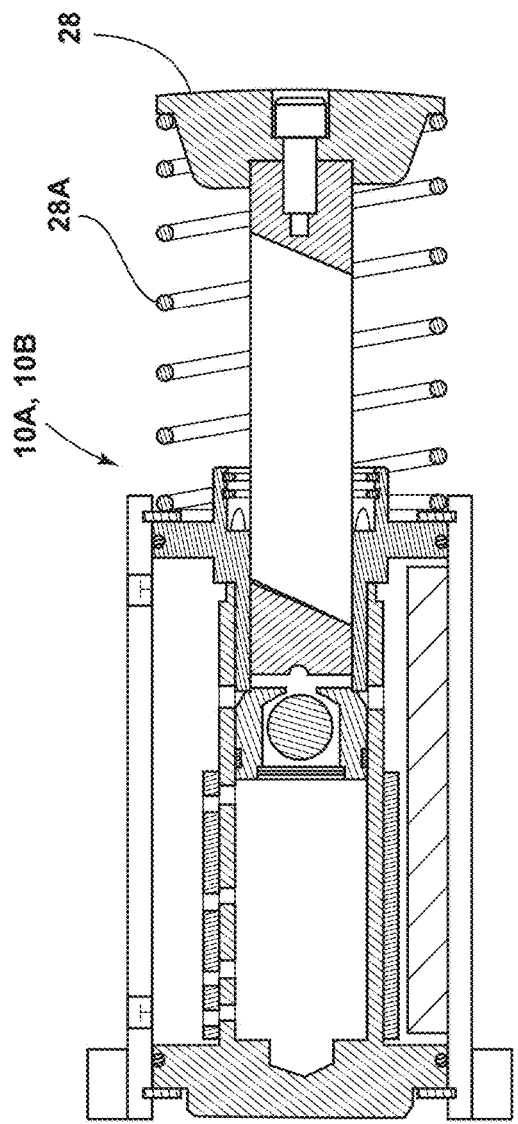
FIG. 1A is a cross sectional view of an industrial shock absorber prior to application of a force to the piston rod.
Figure 1B:
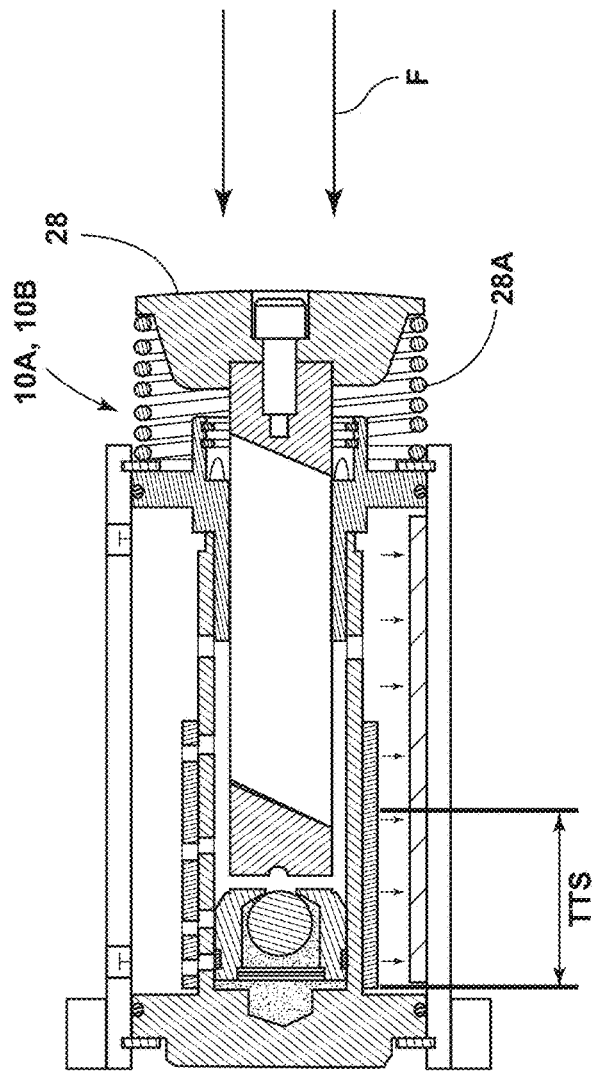
FIG. 1B is a cross-sectional view of the industrial shock absorber of FIG. 1A showing the piston rod in a retracted position after application of an external force.
Figure 1C:
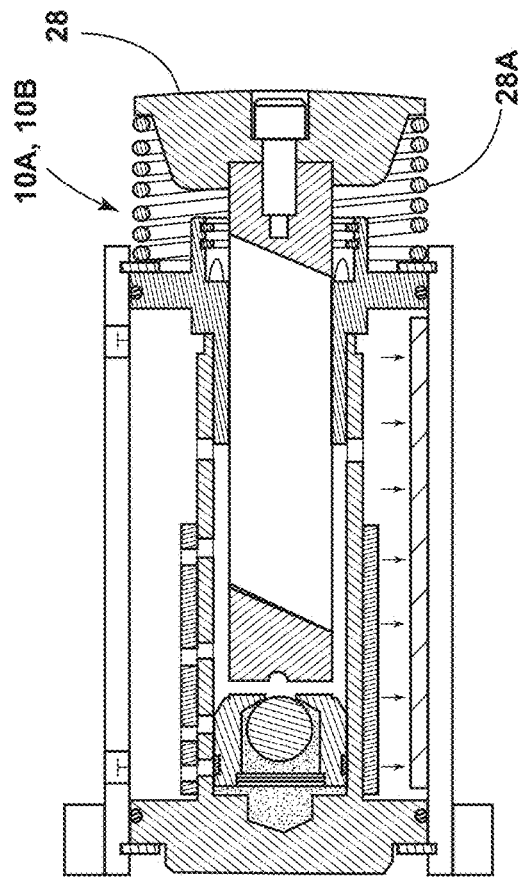
FIG. 1C shows the industrial shock absorber of FIG. 1A after the applied force is released.
Figure 1D:
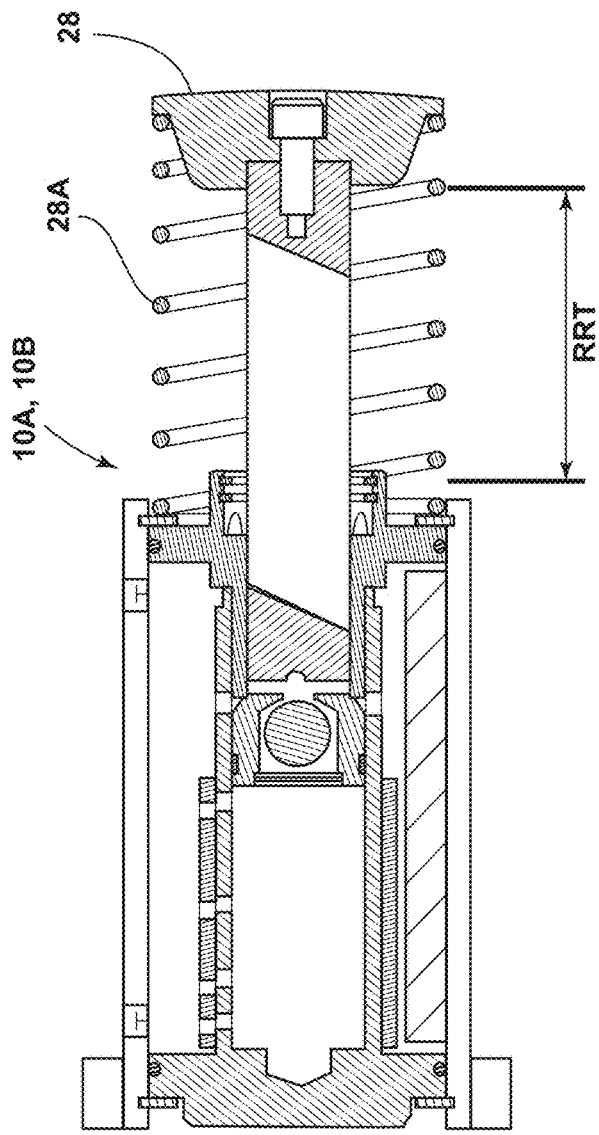
FIG. 1D shows the industrial shock absorber of FIG. 1A after the piston rod returns to its extended position.

With further reference to FIGS. 1A-1B, shocks 10A and 10B may include a coil spring 28A that biases piston rod assembly 28 to an extended position (FIGS. 1A and 1D). When an external force "F" (FIG. 1B) is applied to the piston rod assembly 28, the piston rod shifts from the extended position of FIG. 1A to the retracted position of FIG. 1B due to the force "F". When shocks 10A, 10B are installed in machinery 2 (e.g., FIG. 1 or other equipment), the moving part of the machinery may initially be spaced apart from the end of piston rod assembly 28 to define a gap, and the machinery component may then move into contact with piston rod assembly 28 to apply force "F". After the force "F" is removed as shown in FIG. 1C, the bias of spring 28A causes piston rod assembly 28 to shift back to the extended position of FIG. 1D (i.e., the same extended position as FIG. 1A). In general, the Time-Through-Stroke (TTS) is the time required for the piston rod assembly 28 to move from the extended position of FIG. 1A to the compressed or retracted position of FIG. 1B. The Rod Return Time (RRT) shown in FIG. 1D is the time required for the piston rod assembly 28 to shift from the retracted position of FIG. 1C to the extended position of FIG. 1D upon release of the force "F". It will be understood that the shocks 10A, 10B of FIGS. 1 and 1A-1D or may include an external accumulator 30 (FIG. 3) and other such related components. As discussed below, Time-Through-Stroke (TTS) and Rod Return Time (RRT) can be determined during operation of an industrial shock absorber using sensors, and changes in Time-Through-Stroke (TTS) and/or Rod Return Time (RRT) over time may be used to detect and/or predict failure of the shock. In general, an industrial shock according to the present disclosure does not include a connector on piston rod 28, and a pulling force (e.g., a force acting in a direction opposite to force F of FIG. 1B) cannot be applied to the shock.

The external force F (FIG. 1B) may be repeatedly applied to a shock to thereby cycle the shock. The magnitude of the external force F may be substantially or approximately the same during each cycle.

As discussed in more detail below, sensors 12 may be utilized to monitor operating parameters (e.g. pressure and temperature), and sensors 46, 46A may be utilized to determine operating parameters such as Time-Through-Stroke (TTS) and/or Rod Return Time (RRT). TTS and RRT may be determined utilizing measured data from one or more of sensors 12, and sensors 46, 46A. Changes in these operating parameters may be utilized to predict a remaining life (or failure) of industrial shock 10 and/or to detect a failure of industrial shock 10. Also, if the Time-Through-Stroke (TTS) and/or Rod Return Time (RRT) do not match expected Time-Through-Stroke (TTS) and Rod Return Time (RRT) during initial operation, the system may determine that a failure has occurred even if the Time-Through-Stroke (TTS) and/or Rod Return Time (RRT) have not changed over time (e.g., due to external forces repeatedly acting on the shocks as shown in FIGS. 1A-1C).

The system 1 may include a ground station 16 having one or more computing devices 14 that are operably connected to one or more sensors 12 of industrial shock absorber 10. The sensor 12 and computing device 14 may include wireless transmitters and/or receivers to thereby communicate via a wireless signal 18. The wireless signal 18 may comprise a Wi-Fi signal, a Bluetooth signal, or the like. It will be understood that the sensor 12 may be connected to the computing device 14 utilizing a conventional conductive line or the like. Computing device 14 may also be configured to communicate with one or more remote devices 22 via a network or cloud 20 and/or cell towers 24 or other suitable communication devices. The remote device 22 may comprise a smartphone, computer or the like. For example, the remote device 22 may comprise a smartphone that is utilized by remote personnel to monitor the operation of the industrial shock absorber 10 and/or system 1. Remote device 22 may also comprise a computing device at a monitoring facility. For example, one or more remote devices 22 may be utilized at a centralized location to monitor a plurality of shock absorbers 10 at a plurality of systems 1. In this way, a centralized monitoring facility may be utilized to simultaneously monitor numerous systems 1 at one or more geographic locations. It will be understood that computing device 14 of ground station 16 may be physically located outside of, or remote from the physical structure of ground station 16. Also, computing device 14 may optionally comprise a plurality of computing devices (e.g., computers, processors, controllers, circuits, etc.) that are interconnected. Thus, as used herein, the term "computing device" is not limited to any specific type of hardware and/or software but rather may comprise virtually any number or types of devices in any configuration that perform evaluation and/or monitoring as described herein.

Figure 2:
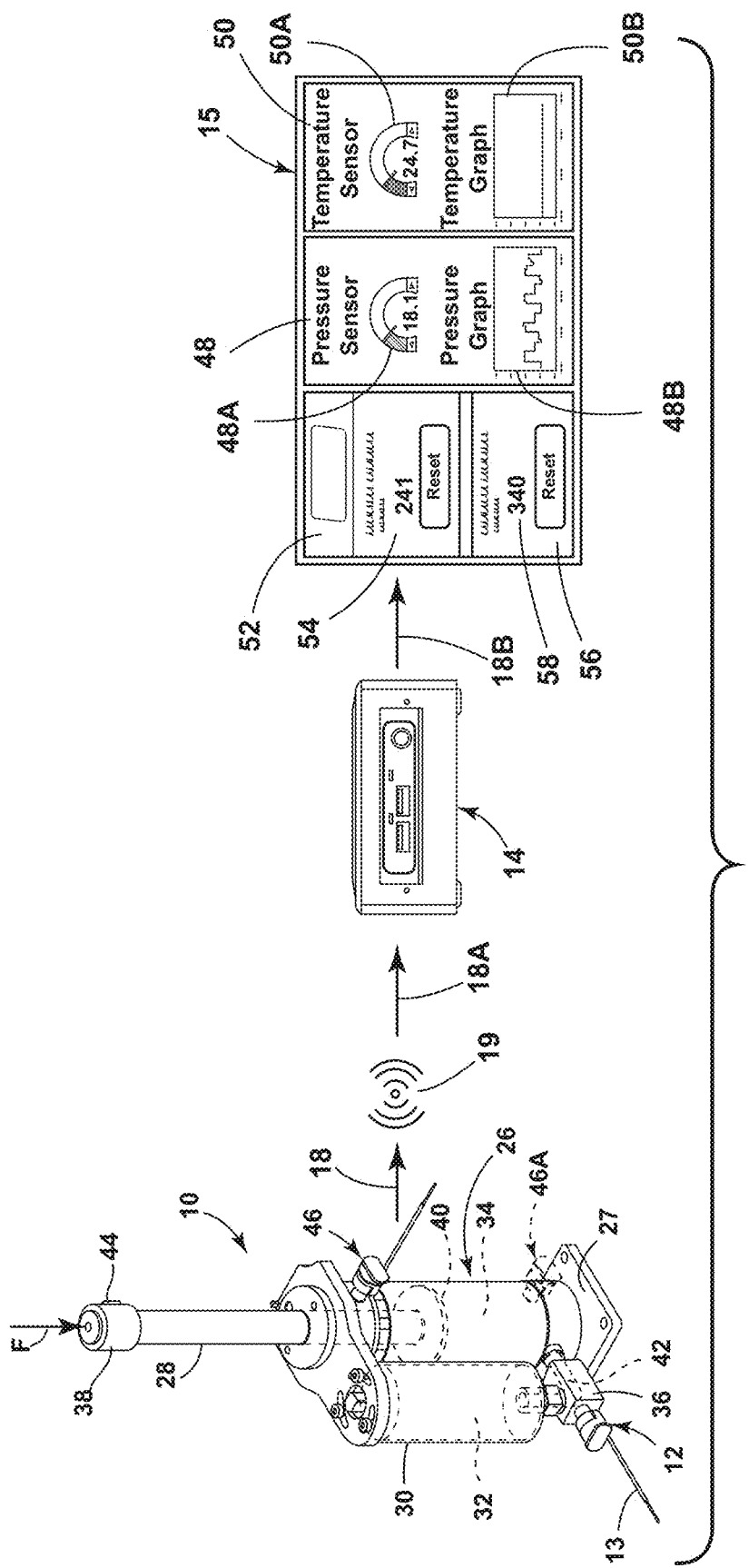
FIG. 2 is a schematic showing a shock absorber, computing device, and display according to one aspect of the present disclosure.

With further reference to FIG. 2, industrial shock absorbers 10A, 10B (FIG. 1) (and/or additional shocks of the system) may comprise an industrial shock absorber 10 having a body in the form of a cylinder 26 and a force-receiving member such as piston rod 28. Industrial shock absorber 10 may include an external accumulator 30 having an internal (secondary) chamber 32 that is fluidly connected to a main chamber 34 of cylinder 26 via a fluid passageway including fitting 36. The configuration of cylinder 26, piston rod 28, external accumulator 38, and the fluid passageway may be substantially similar to those of known industrial shock absorbers. Sensor 12 may be connected to fitting 36 such that the sensor 12 measures the pressure and/or temperature of working fluid (e.g. oil) passing through fitting 36. Thus, the sensor 12 may be configured to measure the pressure and/or temperature of fluid in chamber 32 of external accumulator 30. However, sensor 12 may be configured to measure pressure and/or temperature of working fluid in chamber 34 of cylinder 26. It will be understood that the system may include a plurality of sensors 12 to measure one or more of pressure and/or temperature of working fluid in chambers 32 and/or 34 and/or metering passageway 42 and/or any other suitable location. The industrial shock absorber 10 may include a bracket 27 or other suitable mounting structure to provide for mounting of the industrial shock absorber 10 to a structure of machinery 2 (FIG. 1) or the like. Sensor 12 preferably includes an antenna 13 to provide wireless communication with one or more devices such as computing device 14 of ground station 16 (FIG. 1).

In use, if a force "F" is applied to outer end 38 of piston rod 28, the piston rod 28 moves linearly, and piston 40 (inner end) of piston rod 28 causes an increase in the pressure of working fluid in the main chamber 34 of cylinder 26. A metering passageway 42 and fitting 36 fluidly interconnect the main chamber 34 and the internal chamber 32 of external accumulator 30. The metering passageway 42 controls the flow of the working fluid from main chamber 34 to internal chamber 32 of external accumulator 30 in a manner that is generally known in the art and metering passage 42 may be substantially similar to passageways of known industrial shock absorbers. It will be understood that metering passageway 42 is shown schematically. The metering passageway may include an inner tube (not shown) disposed inside cylinder 26 (outer tube) and the inner tube may include orifices (not shown). Various orifice (metering) configurations are known, and the present disclosure is not limited to any specific orifice/metering configuration. In general, force F may be applied by machinery or other equipment 3A, 3B (FIG. 1) that comes into contact with outer end 38 of piston rod 28. Outer end 38 of piston rod 28 is typically not connected to the moving component of the machinery whereby the moving component of the machinery moves way from end 38 to form a gap, and the moving component then moves back into contact with end 38.

The sensor 12 may be positioned in fluid communication with internal chamber 34 of external accumulator 30 to thereby measure one or more operating parameters of industrial shock absorber 10. The operating parameter may comprise at least one of pressure and temperature of the working fluid in external accumulator 30. However, it will be understood that the sensor 12 could alternatively (or in addition) be configured to measure the pressure and/or temperature of the working fluid in the metering passageway 42 or the main chamber 34.

A wireless sensor 44 may optionally be utilized to measure an operating parameter of industrial shock absorber 10 such as an acceleration of piston rod 28. Sensor 44 may comprise a self-charging sensor including a battery that is charged upon movement of sensor 44. Sensors 46 and/or 46A may optionally be utilized to detect an operating parameter of industrial shock absorber 10. Sensor 46 may comprise a wireless proximity switch or other suitable sensor that may be configured to detect the presence of rod end 40 inside cylinder 26 when piston rod 28 is in a fully extended position to thereby generate a "Rod-OUT" signal. When configured in this way, proximity sensor 46 may provide a limit switch. One or more proximity sensors 46A (e.g. proximity switches) may also be utilized to detect an operating parameter of industrial shock absorber 10. Sensor (s) 46A may comprise proximity switches that detect when piston rod 28 is in a fully retracted (compressed) position. Thus, the system may be configured to detect operating parameters including fully extended ("Rod-OUT") and/or fully retracted/compressed ("Rod-IN") positions of piston rod 28. It will be understood that the switches or sensors utilized to generate "Rod-IN" and the "Rod-OUT" signals may be mounted or configured such that these signals do correspond exactly to the fully retracted and fully extended piston rod positions. For example, the switches and/or sensors may generate a "Rod-IN" signal just before the piston rod reaches the fully retracted position (e.g., FIGS. 1B and 1C), and the switches and/or sensors may generate a "Rod-OUT" signal just before the piston rod reaches the fully extended position (e.g., FIGS. 1A and 1D). Nevertheless, measured Time-Through-Stroke (TTS) and/or measured Rod Return Time (RRT) can be calculated using the sensor/switch data, and the measured TTS and/or RRT can be compared to the expected initial or baseline TTS and/or RRT to determine if a failure or fault was present at the time an industrial shock absorber was initially installed. Changes in measured TTS and/or RRT over time may also be utilized to detect failure and/or to predict failure/expected remaining shock life (e.g., predicted cycles to failure).

Proximity switch or sensor 46 and/or switch or sensor 46A may be configured to send a wireless signal to computing device 14 when rod end 40 is detected (e.g. when piston rod 28 is fully extended or fully compressed). Proximity sensors 46 and/or 46A may be utilized to determine a number of cycles industrial shock 10 has experienced in use (e.g. since being installed in a system 1 or machinery 2) and/or other operating parameters (e.g. Time-Through-Stroke). Sensor 46A may be utilized to generate a "Rod-IN" signal that may also be utilized to determine a number of cycles of industrial shock 10 and/or Time-Through-Stroke. As discussed below, signals from sensors 46 and/or 46A may be utilized to determine Time-Through-Stroke (TTS) and/or Rod Return Time (RRT) of piston rod 28. TTS and RRT may be utilized to predict the remaining life of industrial shock 10 and/or to detect failure or malfunction of industrial shock 10. It will be understood that the remaining life (failure) of industrial shock 10 may be determined based on predefined criteria such as degraded performance or likelihood of complete mechanical failure. Thus, failure according to the predefined criteria does not necessarily require that the shock ceases to function entirely.

Alternatively, sensor 46 and/or sensor 46A may comprise a position sensor that is configured to detect (measure) a position of piston rod 28 relative to cylinder 26. The position data may be measured continuously or at very small time intervals (e.g. 1.0 seconds, 0.5 seconds, 0.1 seconds, 0.05 seconds, 0.01 seconds, 0.005 seconds, 0.0001 seconds, etc.), and the position and time data may be utilized to determine the velocity of piston rod 28 during each cycle of industrial shock 10 by numerically calculating a derivative of position with respect to time. It will be understood that a curve fit may be utilized on the measured data to provide a generally smooth (continuous) measured input data. The acceleration of piston rod 28 may also be determined by taking (calculating) a second derivative of position with respect to time. As discussed in more detail below, data from sensor 12 and/or sensor 46 and/or sensor 46A may be utilized to determine a predicted life of industrial shock 10 and/or to determine if industrial shock 10 has failed according to predefined failure criteria. Acceleration sensor 44 is not necessarily required if sensor 46 is configured to determine acceleration and/or if a life cycle prediction and/or failure criteria determination do not require acceleration. It will be understood that industrial shock 10 may include sensors 12, 46, and 46A, only sensor 12, only sensor 46, only sensor 46A, or any combination of sensors 12, 46, 46A. Furthermore, the location, type, and number of sensors 12, 46, 46A, etc. may vary as required for a particular application, and the present disclosure is not limited to any specific number of sensors or types of sensors. In general, virtually any sensors capable of providing data relating to operating parameters and/or the number of cycles may be utilized.

Referring again to FIG. 2, the sensors 12 and/or 46 and/or 46A of industrial shock absorber 10 are configured to communicate with one or more computing devices 14 utilizing wireless signals 18 and 18A. It will be understood that virtually any communication means (e.g. hard lines) may also be utilized. The wireless signals from sensors 12 and/or 46 may be communicated via a wireless receiver node 19 that is configured to use Wi-Fi, MQTT, Bluetooth, LORA, NuBit, eSIM, GSM, Ethernet, Paho or other suitable wireless technology. The wireless receiver node 19 generates wireless signals 18B that are received by the computing device 14. The computing device 14 may comprise virtually any suitable computing device or devices, and may be programmed to process data from sensors 12 and/or 46 of an industrial shock absorber 10. It will be understood that, if required for a particular application, data from only one of sensors 12, 46, 46A, or data from any combination of the sensors may be utilized. The computing device 14 may be configured to receive data from a plurality of shock absorbers 10 having sensors 12, and/or 46, and/or 46A, and the computing device 14 may be configured to process the data from multiple sensors 12 and/or 46. Each sensor 12, and/or 46, and/or 46A may have a unique identifier (e.g. a Serial No.), and data from each sensor 12, and/or 46, and/or 46A over time may be stored and retrieved using the Serial No. for processing and evaluation.

The computing device 14 is preferably configured to generate notifications that may be transmitted wirelessly via a signal 18B to a notification device such as a display screen 15 that may optionally be located at ground station 16 (FIG. 1). The notification device may alternatively comprise a smartphone 22 or other device that is located remote from the ground station 16. It will be understood that the system may include a plurality of screens and/or other suitable notification devices disposed at various locations.

Display 15 (FIG. 2) may include a first portion 48 that displays pressure data from sensor 12, and a second portion 50 that displays temperature data from sensor 12. The pressure and/or temperature data may be displayed in graphic form and/or numerically, and/or in any other suitable manner. For example, the pressure sensor display may include a real-time display 48A showing current pressure readings, and a chart or graph 48B displaying pressure over time. Similarly, the temperature display may display the current temperature 50A and temperature over time 50B. The pressure and/or temperature displays may be continuously and rapidly updated.

Notification device 15 may include a pressure cycle display 52 that displays the number of pressure peaks 54 that an industrial shock absorber 10 has experienced. Pressure cycle display 52 may be provided utilizing pressure data from pressure sensor 12. It will be understood that the number "241" shown in FIG. 2 is merely an example of a number of cycles that an industrial shock absorber 10 may have experienced in operation, and the number will increase over the life of industrial shock absorber 10. Notification device 15 may also include a rod position cycle counter display 56 that displays the number of cycles measured by proximity sensor 46 and/or sensor 46A. As discussed in more detail below, the system may be configured to detect and/or predict failure of one or more shocks 10 that are operably connected to the system based, at least in part, on data from sensor 12, and/or sensor 46, and/or sensor 46A.

Figure 2A:
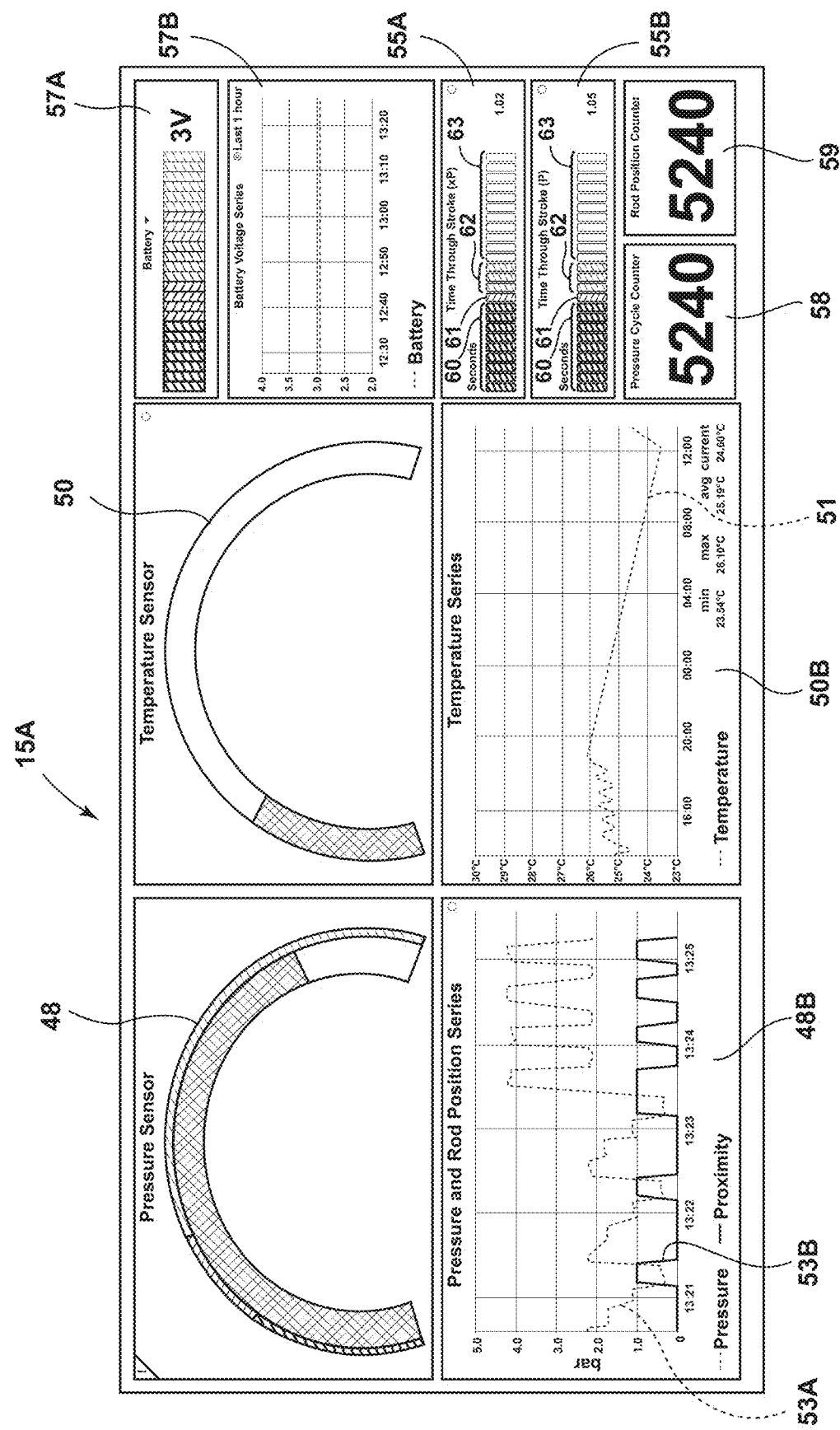
FIG. 2A is a display according to another aspect of the present disclosure.

With reference to FIG. 2A, a display or "dashboard" 15A according to another aspect of the present disclosure may include a pressure sensor indicator 48, a temperature sensor indicator 50, a pressure and rod position series display 48B, and a temperature series display 50B. Display 48B may include a data line or display 53A showing pressure measurements over time, and a rod position data line 53B showing rod position (e.g. Rod-IN or Rod-OUT) as a function of time. Display 50B includes a line 51 showing temperature from the temperature sensor over time. The display 15A may also include displays 57A and 57B showing the battery voltage of one or more batteries of sensors 12. Display 15A may also include a pressure cycle counter 58 and a rod position counter 59. In general, the number of cycles counted utilizing pressure (i.e. display 58) is equal to the number of cycles based on rod position data (i.e. display 59). However, differences in the counts may indicate an operational problem with the industrial shock 10 or failures of one or more sensors utilized to generate the data for displays 58 and 59.

Display 15A may also include displays 55A and 55B showing Time-Through-Stroke (TTS). Display 55A may display the latest TTS, and display 55B may display the TTS for the preceding cycle. The displays 55A and 55B may include red colored bars or displays 60 corresponding to a TTS that is too low (i.e. the rod is traveling too fast) relative to predefined criteria. The display regions 61 may comprise yellow indicator bars that also indicate that the TTS is too fast, and green bars 62 may be utilized to indicate a TTS that is within a hand optimum or predefined acceptable range.

The bars or displays 63 may comprise darker colors (e.g. brown, dark red), and may indicate that the TTS is too long (i.e. the rod is traveling too slow), and industrial shock 10 may be failing or approaching failure. It will be understood that virtually any colors or display configurations may be utilized to indicate TTS. The displays 55A and 55B provide information to an operator concerning the TTS for the most recent cycle of the industrial shock 10, and also for the cycle immediately preceding the most recent cycle.

The system may be configured to evaluate the data from sensor 12, and/or sensor 46, and/or sensor 46A over time to determine if a trend exists indicating that the industrial shock absorber 10 is no longer functioning properly and/or to predict a future failure of the industrial shock absorber 10. For example, an industrial shock absorber 10 may be subject to testing to gather empirical measurements of pressure, temperature, and/or other operating parameters over time, and this data may be utilized to develop criteria for predicting failure (e.g. sufficiently, degraded performance) of an industrial shock absorber 10 in use. If testing shows that pressure and/or temperature data typically changes over time (e.g. linear or exponential peak pressure decline as a function of a number of cycles) and if failure is likely to occur once peak pressure reaches or approaches a given value, the measured pressure data can be utilized to predict the remaining number of cycles for the life of the shock.

Also, if one or more shock absorbers 10 are in use in a plurality of devices (e.g. a plurality of machines 2 or other devices (FIG. 1)), historical data for numerous shock absorbers 10 can be gathered, stored, and evaluated to determine criteria for predicting future failure of the shock absorbers 10. The computing device 14 may be configured to generate signals to one or more notification devices 15 (or 15A) to alert an operator and/or a remote facility to a failure and/or to provide an operator with an estimated lifespan (e.g. remaining number of cycles) for one or more shock absorbers 10.

The one or more computing devices 14 may be operably connected to one or more remote devices 22. For example, remote device 22 (FIG. 1) may comprise a device or system at a central monitoring station or facility that is operably connected to a plurality of shock absorbers 10 at a plurality of geographic locations. Engineers or other technical specialists at the monitoring center may monitor and evaluate the data received from the shock absorbers 10A, 10B (FIG. 1) at one or more remote geographic locations to provide additional monitoring and alerts to operators or other personnel at the individual devices 1 and/or facilities/locations. This data may be utilized to develop additional criteria to predict shock lifespans, acceptable combinations of operating parameters, etc.

As discussed in more detail below, the system 1 may utilize a controller that is configured to predict the normal end-of-life of one or more shock absorbers 10 and/or detect and/or predict failure based on the deterioration of the operating parameters (characteristics) of the industrial shock absorber 10. In general, the detected or predicted failure may be a premature failure, or a failure that is consistent with an expected life of industrial shock 10, or a failure that is delayed beyond an expected shock life. The system may be configured to detect and evaluate deterioration of the operating parameters (characteristics), which can be profiled using failure signatures that are read by one or more of the sensors 12, 44, 46, 46A, etc. of the shock absorbers 10.

Each sensor 12, 44, 46, 46A, etc. may optionally have a unique digital identifier (e.g. a Serial Number) which may be associated with each specific industrial shock absorber 10 to provide for live monitoring of the performance characteristics of each individual industrial shock absorber 10 by collecting data for one or more of pressure, temperature, vibration, and/or other operating parameters. These signals (e.g. data) may be communicated to a ground control station 16 using a suitable wireless protocol such as Wi-Fi, Bluetooth, MQTT, LORA, NuBit, Ethernet, Paho, etc., or other suitable arrangement.

The system may be configured to provide information regarding the number of cycles that each industrial shock absorber 10 has experienced (e.g. cycle counters 54 and/or 58, FIG. 2). The computing device 14, or other computing device, may be configured to determine information regarding the number of cycles, TTS, and RRT based on information calculated from pressure peaks and/or rod position during each impact on the industrial shock absorber 10. The system may be configured to compute the end-of-life of each industrial shock absorber 10 based on the number of cycles and/or the operating temperature and/or TTS and/or RRT and/or virtually any other measured variable (operating parameter) of each industrial shock absorber 10.

The computing device 14 and/or other computing facilities of the ground station (or remote facility) may optionally be configured to perform edge computing on the signals from each unique digital asset (sensor) over time, and compare the values with a historical data set stored in the computer device 14 or other device. The system may be configured to utilize an algorithm that conditions the values and profiles the failure type based on the collected sensor readings/data. Based on the failure profile, a notification may be sent to an operator or other facility, and additional actions may then be performed. The ground control station 16 may be configured to provide a live relay of the performance characteristics of one or more shock absorbers 10 in a dashboard view (e.g. notification devices 15, 15A, FIGS. 2 and 2A) to one or more operators and/or remote personnel.

The system provides a solution wherein the performance values (failure and/or warning criteria) can be calibrated by engineers or other technical personnel so that the algorithms can be modified (if necessary) and used to detect specific failures based on the needs of a specific user. The system may be configured as required for various types of machinery and devices. Also, the system may be configured to predict failure for specific types or sizes of shock absorbers 10. Thus, the system may be modified to provide failure prediction and/or warning for specific types/sizes of shocks 10, and/or the particular application. For example, a specific size and type of industrial shock 10 may be used in a first machine (e.g. 3A, FIG. 1) and an identical industrial shock 10 may also be used in a second machine (e.g. 3B, FIG. 1) having a significantly different configuration. In use, the pressures, temperatures, Time-Through-Stroke (TTS) and Rod Return Time (RRT) may be significantly different due to differences between the first and second machines. The operating parameter criteria utilized to determine shock failure and/or shock failure prediction may (optionally) be different for the two different machines. For example, a 25 psi measured pressure could trigger a "caution" type warning for a first machine 3A, whereas the same 25 psi pressure could trigger a "failure" warning for a second machine 3B.

Figure 3:
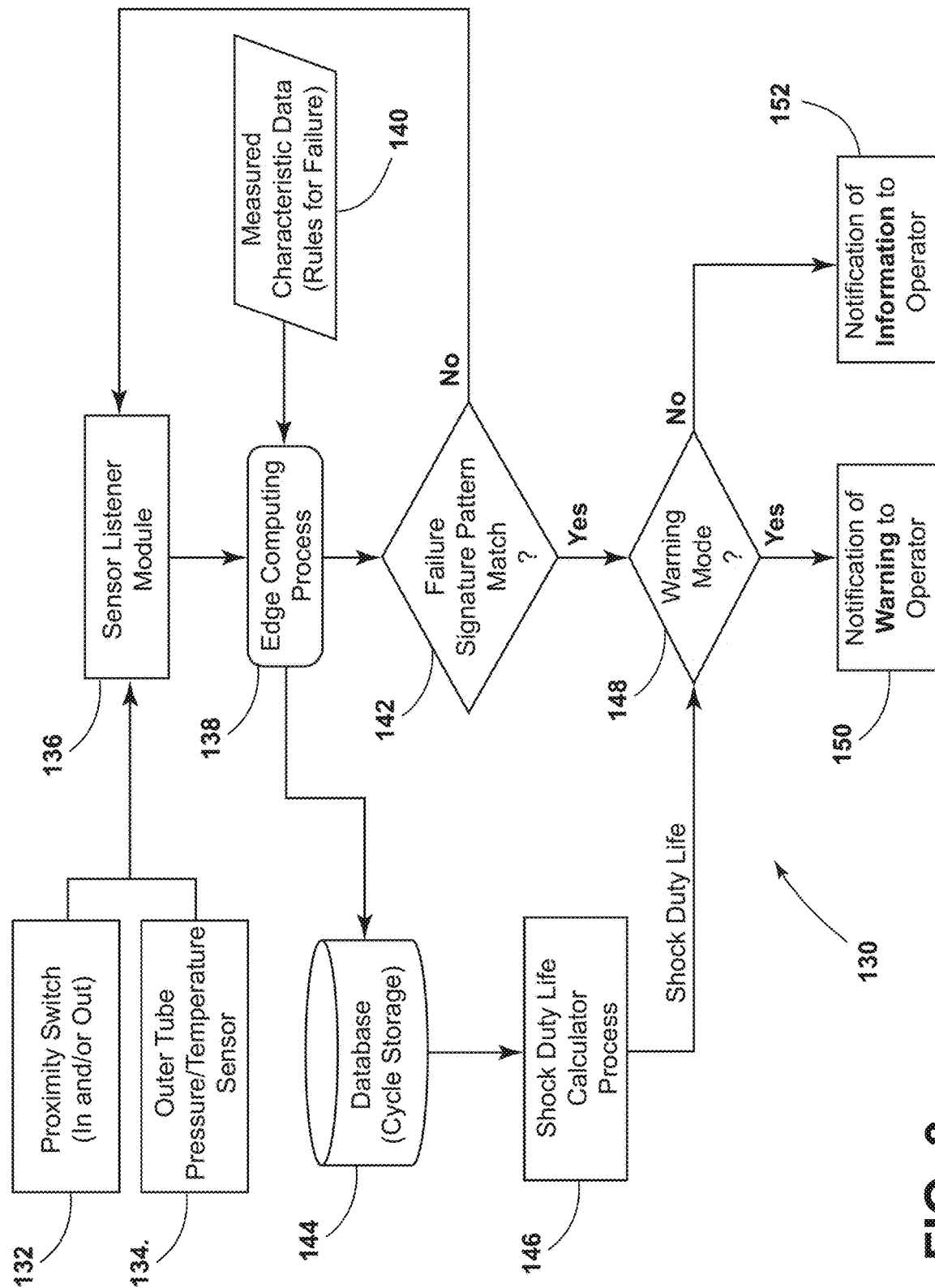
FIG. 3 is a flow chart according to one aspect of the present disclosure.

With further reference to FIG. 3, a process 130 according to another aspect of the present invention utilizes data 132 from proximity sensor (e.g. switch) 46 and/or 46A and pressure and/or temperature data 134 from a sensor 12. It will be understood that the sensors may comprise wireless sensors, or the sensors may be connected to computing device 14 and/or other devices utilizing conductive lines. At step 136, the data 132 and/or data 134 is processed, and then transferred to edge computing service listener at step 138. Steps 136 and 138 may be performed by a wireless device and/or a computing device. Measured data 140 is also supplied to edge computing service listener 138, and data is transferred to database 144. The database 144 may comprise one or more computing devices.

The measured data 132 and 134 is transferred to step 142, and the system (e.g. one or more processors) determines if the data satisfies predefined failure criteria. If not, the process loops back to step 136. However, if the system determines that the measured data meets predefined failure criteria (discussed below), the system proceeds to step 148. At step 148, the system utilizes shock duty life calculation data from step 146, and determines if a warning mode is to be implemented. If a warning mode is to be implemented, the system proceeds as shown at step 150, and the system provides a warning to the operator. If the system determines that a warning mode is not required at step 148 (i.e. warning criteria has not been satisfied), the system proceeds to step 152, and notification information is provided to an operator. In general, the warning and/or information of steps 150 and 152 may be provided by a display screen, audio device, or a warning can be transmitted remotely to other devices 22 such as smartphones, laptop computers, and/or centralized computing devices and systems at a central monitoring facility and/or at other locations.

The system may be configured to utilize machine learning pattern analysis "ML" to determine if industrial shock 10 has failed, or is likely to fail. A machine learning process 75 (FIG. 3A) utilizes one or more inputs from a vibration sensor 76 and/or force, pressure, and temperature sensor 77. The data from sensor 76 and 77 is received by a sensor listener module 78, and the data is then provided to an edge computing process 79. The output from the edge computing process 79 is utilized at step 80 to determine if a similar feature exists. In general, step 80 determines if a measured pattern is sufficiently similar to a "problem" pattern according to predefined criteria. If a similar feature does exist, the system determines if a warning 85 or information 86 should be generated at decision step 84. If a similar feature does not exist (step 80), the process calculates a distance of the measured feature (pattern) from an acceptable ("OK") or unacceptable ("not OK") feature at step 81. At step 82, the system adds the new feature as "OK" or as "not OK." The feature (with its "OK" or "not OK" designation) is stored in a features storage shown schematically at step 83. The "OK" and "not OK" features of step 83 are utilized at edge computing process 79 to provide input to step 80.

Figure 3A:
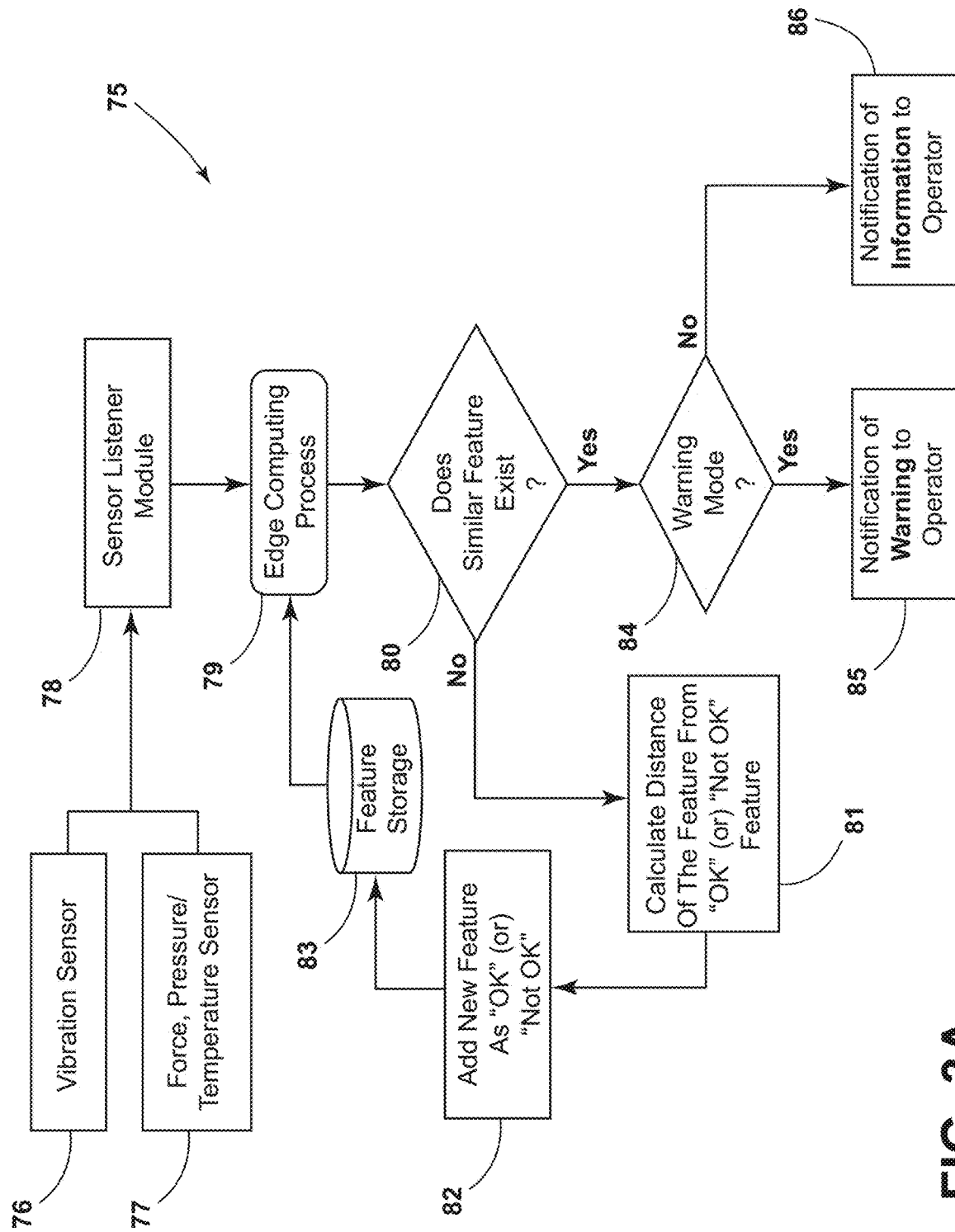
FIG. 3A is a flow chart according to another aspect of the present disclosure.
Figure 3B:
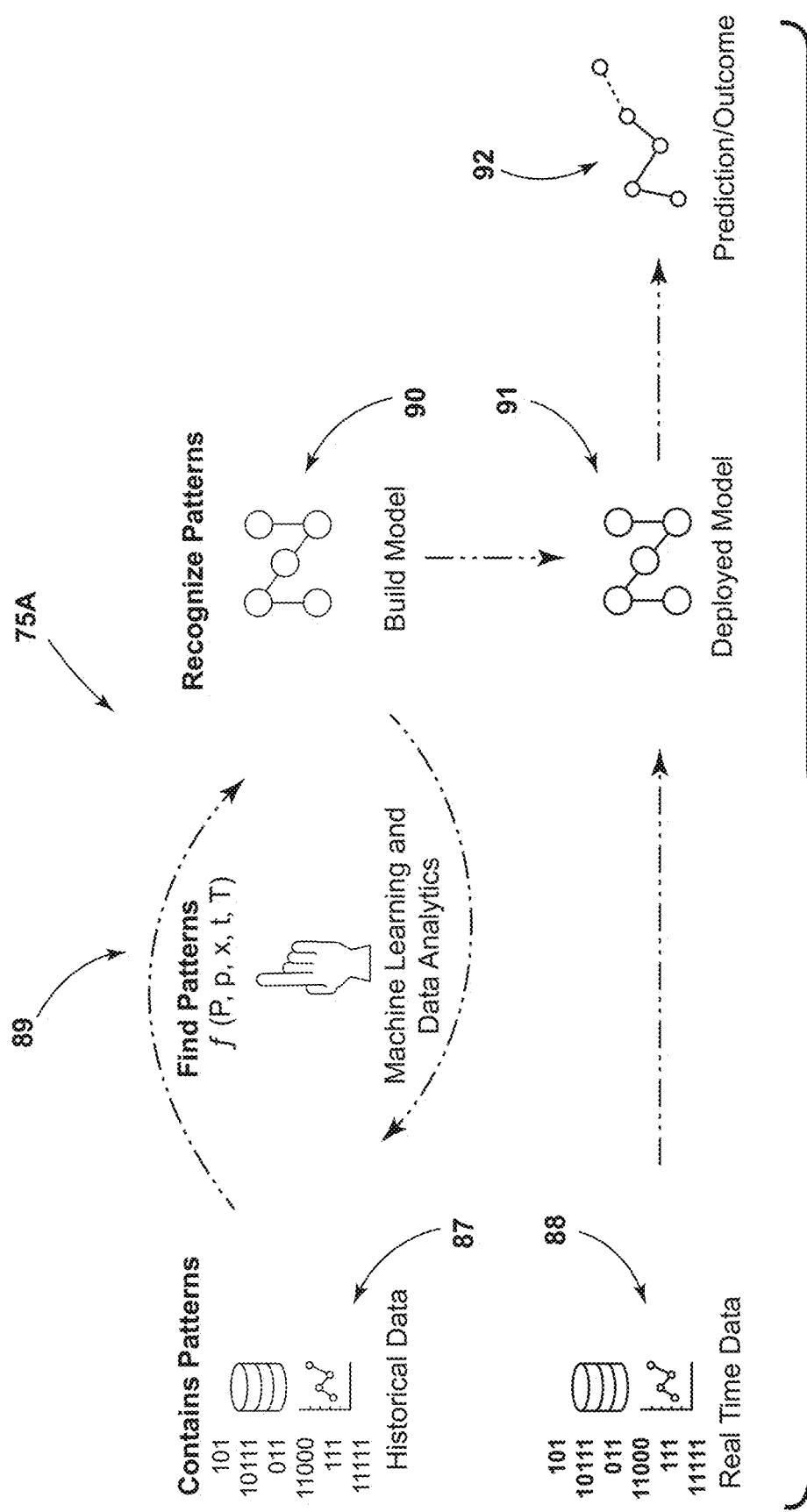
FIG. 3B is a schematic showing machine learning according to another aspect of the present disclosure.

A machine learning process according to another aspect of the present disclosure is shown schematically in FIG. 3B. In general, the machine learning process 75A may include preconfigured historical data patterns 87 for a shock absorber which has been sized for a specific application. This information is stored in database installed within an edge computing device 14 which may be configured to perform deep learning of the shock absorber during its operation. The machine learning process 75A may comprise algorithms which study (recognize) anomalies, outlier conditions and predicted outcomes by comparing real-time data 88 with patterns from historical data 87. As shown schematically at step 89, the system may be configured to find patterns and conduct machine learning and data analytics to recognize patterns 90 and build a model 91 to thereby provide a prediction/outcome 92. Thus, the system may be configured to utilize predefined failure criteria programmed into the system prior to (or during) installation and/or the system may develop new failure criteria via machine learning whereby the failure criteria may be updated or modified during operation of the system.

As discussed in more detail below, in connection with FIGS. 5A-7B, the machine learning of FIGS. 3A and 3B may be utilized to detect and/or predict failure using measured data from one or more sensors. FIGS. 4A-4D are schematics (graphs) showing various criteria that may be utilized to determine (calculate) Time-Through-Stroke (TTS) of an industrial shock 10 using sensor data, and FIGS. 5A, 5B, 6A, 6B, 7A, 7B, and 8 are graphs showing criteria that may be utilized to calculate Rod Return Time (RRT).

Figure 4A:
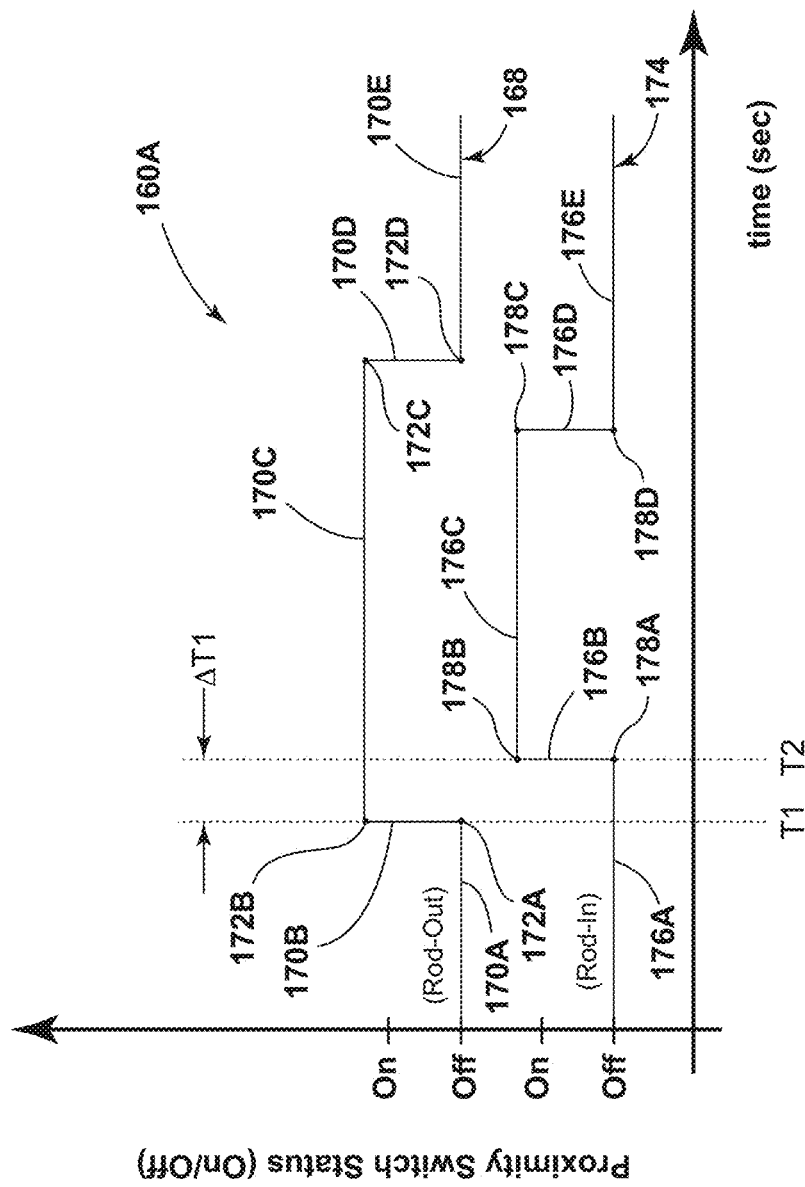
FIG. 4A is a graph showing Time-Through-Stroke (TTS) calculation according to one aspect of the present disclosure.
Figure 4B:
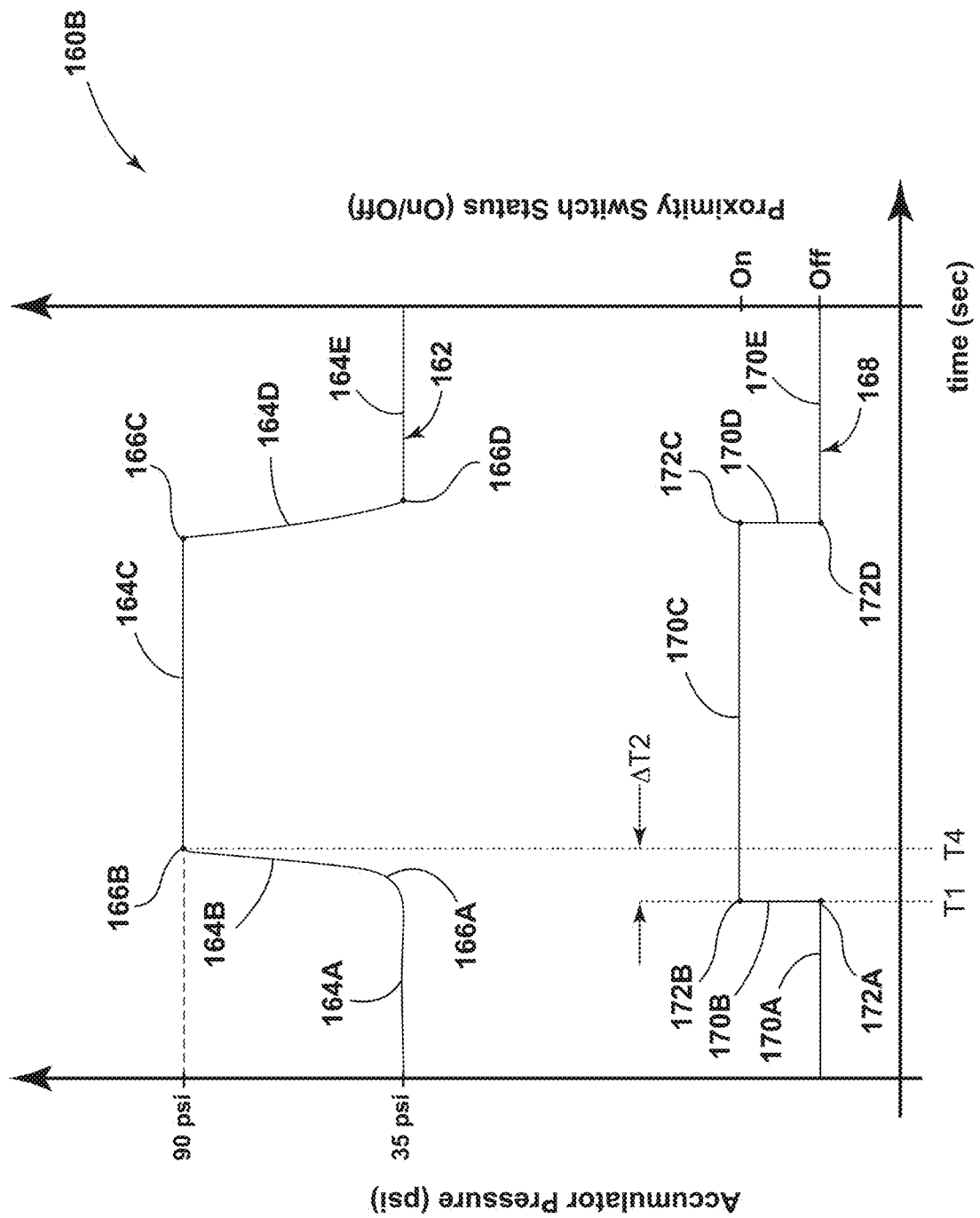
FIG. 4B is a graph showing Time-Through-Stroke (TTS) calculation according to another aspect of the present disclosure.
Figure 4C:
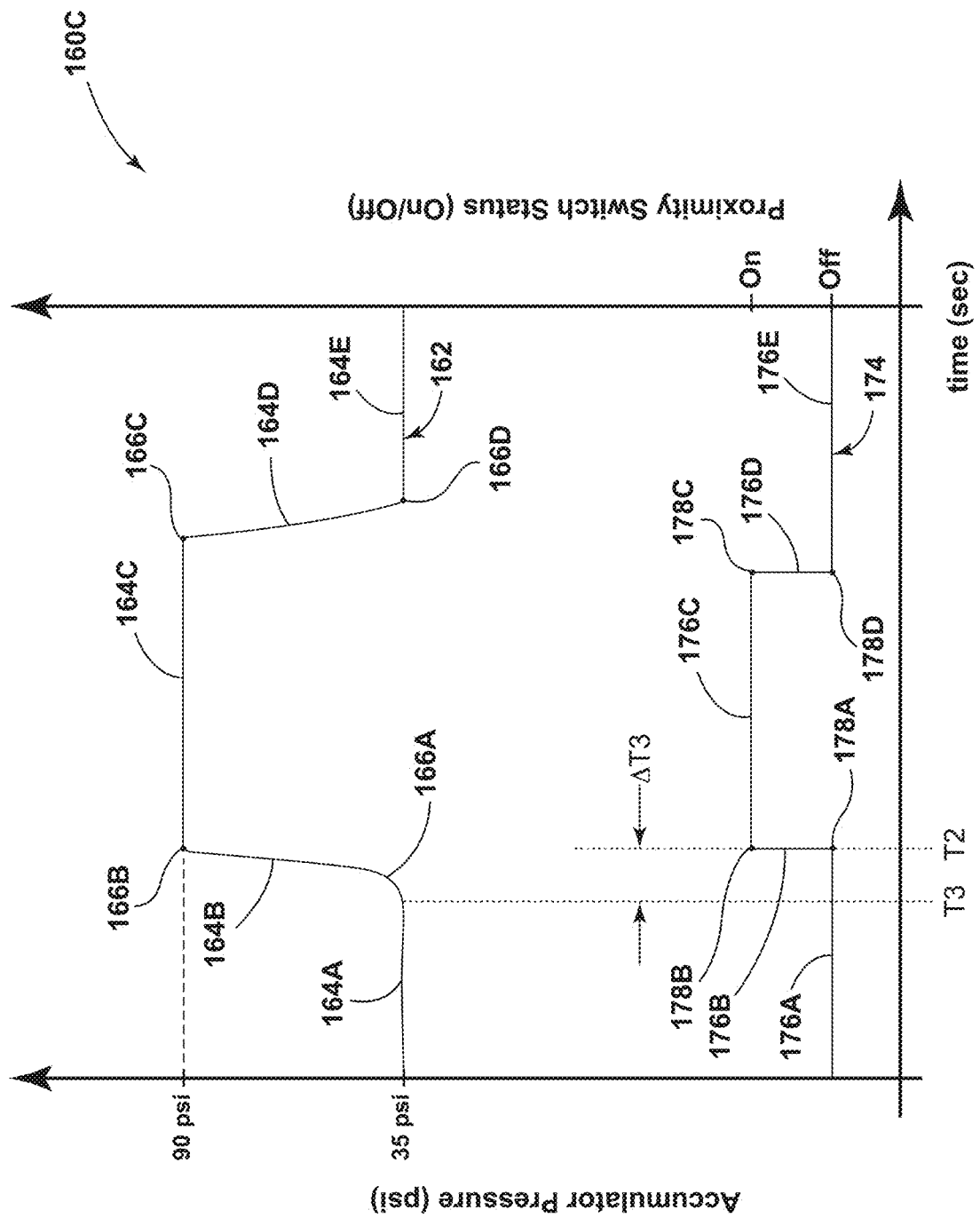
FIG. 4C is a graph showing Time-Through-Stroke (TTS) calculation according to another aspect of the present disclosure.
Figure 4D:
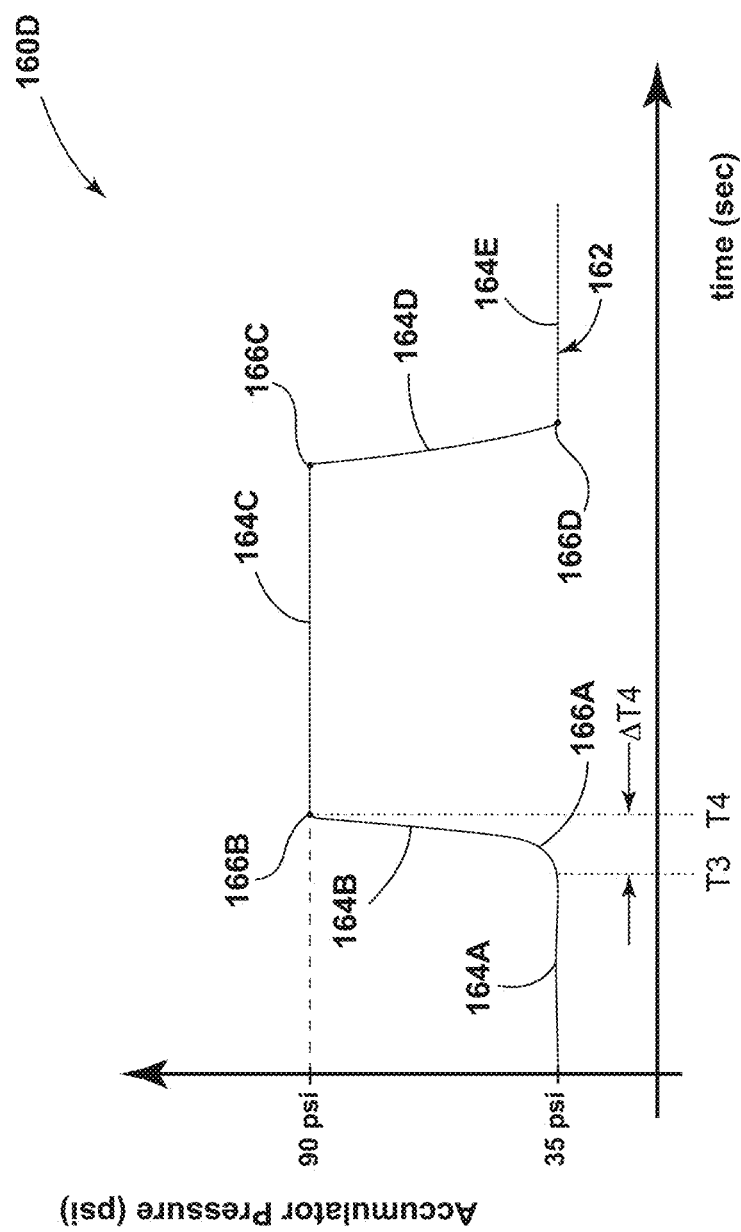
FIG. 4D is a graph showing Time-Through-Stroke (TTS) calculation according to another aspect of the present disclosure.

In FIGS. 4A-4D, the RRT is designated $\Delta T_1$-$\Delta T_4$, respectively. As discussed in more detail below, FIG. 4A illustrates calculation of TTS using two proximity sensors (Rod-OUT and Rod-IN). FIGS. 4B and 4C illustrate calculation of TTS using the signal from one proximity sensor (either Rod-OUT or Rod-IN) along with a pressure signal from the accumulator. FIG. 4D illustrates the calculation of TTS using only a pressure signal (e.g. from the accumulator).

It will be understood that the approaches of FIGS. 4A-4D for determining TTS could be combined in any combination. For example, the TTS could be determined utilizing a plurality of approaches (e.g. 2 or more of the approaches of FIGS. 4A-4D), and an average TTS could be determined. The average TTS could be utilized to determine and/or predict shock absorber failure. It will be understood that FIGS. 4A-4D are schematic in nature, and the actual signals from the switches and sensors may vary according to a particular application.

In FIGS. 4A-4D, the vertical line "$T_1$" represents the time at which a signal 168 from a Rod-OUT switch (sensor) transitions from "Off" to "On." The line "$T_2$" represents the time at which a Rod-IN signal 174 from a switch (sensor) transitions from an "Off" state to an "On" state. As shown in FIG. 4D, the time "$T_3$" represents the time at which a pressure signal 162 begins to increase during a cycle, and the time "$T_4$" represents the time at which the pressure signal transitions to a horizontal or constant value.

With reference to FIG. 4A, sensor data 160A comprises sensor readings from a Rod-OUT proximity switch (line 168), and a Rod-IN proximity switch (line 174). Lines 168 and 174 of FIG. 4A represent the "On" and "Off" states of the Rod-OUT and Rod-IN proximity switches, respectively. Line 168 includes horizontal "Off" segments 170A and 170E, and a horizontal "On" segment 170C. The vertical line segments 170B and 170D represent the transitions from the "Off" state to the "On" state and vice versa. Points 172A-172D represent the transitions between these line segments. Similarly, the line 174 includes horizontal "Off" portions 176A and 176E, and a horizontal "On" segment 176C, and vertical transition line segments 176B and 176D. The points 178A-178D represent the transitions between the horizontal and vertical line segments. $\Delta T_1$ is the Time-Through-Stroke (TTS) operating parameter, which may be calculated by taking the difference between the times of vertical lines $T_1$ and $T_2$.

With reference to FIG. 4B, $\Delta T_2$ represents the TTS, which is equal to the distance between vertical lines $T_1$ and $T_4$. Sensor data 160B includes a pressure signal line 162 from the accumulator, which generally incudes a first horizontal line segment 164A (baseline pressure) that transitions to a sloped line segment 164B at a radiused corner 166A as the pressure initially increases during a cycle. The pressure then levels off as shown by horizontal line segment 164C extending between points 166B and 166C. The pressure then drops as shown by the line segment 164D extending between points 166C and 166D, and transfers to a horizontal (baseline) pressure as shown by horizontal line segment 164E. It will be understood that the line 162 is representative, and the actual line segments 164A-164E may not be completely linear, and the transitions 166A-166D may comprise points, curves, etc. The Time-Through-Stroke $\Delta T_2$ (TTS) of FIG. 4B may be calculated by taking the distance between vertical lines $T_1$ and $T_4$.

Measurement criteria may be utilized to generate a plurality of pressure measurements (i.e. line 162; FIG. 4B) and proximity switch measurements (i.e. line 168) over a period of time while the shock is in use to thereby permit changes in the $\Delta T_2$ (TTS) operating parameter over time to be determined. The changes in $\Delta T_2$ (TTS) over time can be utilized to predict the end-of-life of an industrial shock 10 and/or to detect deterioration in the performance of an industrial shock 10 that may be indicative of wear or problems that may indicate that an industrial shock 10 is approaching end-of-life, even if the changes in the $\Delta T_2$ (TTS) operating parameter do not constitute an actual (complete) failure or end-of-life of the shock.

With reference to FIG. 4C, a Time-Through-Stroke $\Delta T_3$ (TTS) operating parameter for sensor data 160C may be calculated by determining a distance between times $T_3$ and $T_2$. As noted above, time $T_3$ represents the time at which the pressure signal 162 begins to increase, and the time $T_2$ represents the transition of the Rod-IN signal 174 from the "Off" state to the "On" state.

With reference to FIG. 4D, Time-Through-Stroke $\Delta T_4$ (TTS) operating parameter for sensor data 160D may be calculated by taking the difference between the times $T_3$ and $T_4$. The times $T_3$ and $T_4$ represent the times at which the pressure signal 162 initially begins to increase ($T_3$), and the time at which the pressure signal 162 transitions to a relatively constant value ($T_4$).

The system may be configured to determine the Time-Through-Stroke (TTS) operating parameter utilizing one or more of the approaches shown in FIGS. 4A-4D, and the Time-Through-Stroke (TTS) data for a given shock may be repeatedly calculated and stored. For example, the system may be configured to determine only a single Time-Through-Stroke (i.e. one of $\Delta T_1$, $\Delta T_2$, $\Delta T_3$, or $\Delta T_4$). Alternatively, the system may be configured to utilize a combination of the TTS calculations. Also, TTS may be calculated utilizing only proximity sensor data (i.e. only line 168, only line 174, or lines 168 and 174). The TTS calculated for each cycle (or, for example, 1 in 10 cycles) may be stored and compared to new TTS data overtime to detect and/or predict failure.

Furthermore, other operating parameter criteria may be utilized to determine if a shock is degrading and/or to predict the end-of-life of an industrial shock 10. For example, with reference to FIG. 4D, the pressure (line 162) may initially vary between 35 psi (baseline pressure) and 90 psi (peak pressure) for a given industrial shock 10. However, over time, one or both of these pressures may decline, and this decline could be utilized to predict shock wear and/or end-of-life of an industrial shock 10. For example, a failure of an industrial shock 10 may be defined as a peak pressure that is less than 60 psi, and the system may be configured to generate a failure signal if the peak pressure drops below 60 psi. Also, if the peak pressure over time declines from 90 psi to (for example) 70 psi, this decline can be extrapolated to predict a time or number of cycles at which the pressure is predicted to drop below 60 psi. This end-of-life prediction can be continuously updated and conveyed to users at ground station 16 and/or a remote facility or device 22 (FIG. 1). This information may be provided on display screen 15 (FIG. 2) or other suitable device. It will be understood that the information may also be provided in an audio form in connection with a visual display or solely as an audio signal.

Time-Through-Stroke (TTS) changes over time can also be utilized to predict end-of-life of an industrial shock 10 and/or to detect failure of industrial shock 10. In general, the Time-Through-Stroke (TTS) for an industrial shock 10 will be approximately the same each time an industrial shock 10 is exposed to the same load. In some applications (e.g. production machinery), an industrial shock 10 may be exposed to a force of a specific magnitude in a repetitive manner (i.e. the magnitude of the load is the same for each cycle). If an industrial shock 10 begins to wear and/or experiences a failure (e.g., due to a loss of oil), the Time-Through-Stroke for the industrial shock 10 may decrease even if the loads applied to the industrial shock 10 over time are substantially the same. Thus, the Time-Through-Stroke (TTS) operating parameter for an industrial shock 10 over time may be utilized to predict end-of-life and/or to detect failure. For example, if empirical data shows that a given industrial shock 10 has a high probability of failure once the Time-Through-Stroke (TTS) operating parameter drops to a predefined critical time, this predefined Time-Through-Stroke (TTS) time may be utilized to predict end-of-life (e.g. the Time-Through-Stroke (TTS) data over time can be used to extrapolate to a number of cycles at which the industrial shock 10 will reach the critical Time-Through-Stroke (TTS) time).

Empirical data concerning shock failure and corresponding operating data (parameters) may be utilized to predict shock end-of-life. The empirical data may be utilized to determine correlations between the measured operating conditions/parameters (e.g. pressure, temperature, number of cycles, Time-Through-Stroke (TTS), etc.), and the data can be utilized to extrapolate measured data (operating parameters) in shocks 10 that have not failed to predict the end-of-life of a given industrial shock 10. For example, a plurality of end-of-life predictions may be determined for a given industrial shock 10 utilizing different criteria (e.g. both pressure criteria and Time-Through-Stroke criteria), and the criteria providing the shortest predicted shock life may be utilized to generate a warning if the end-of-life is predicted to be approaching. It will be understood that the various end-of-life predictions may be continuously recalculated and conveyed to operators at ground station 16 and/or to a remote device or facility 22. Furthermore, the criteria utilized to predict end-of-life for a given industrial shock 10 may be modified over time if additional data is developed showing that variations in the end-of-life prediction provided more accurate ways to predict the end-of-life of an industrial shock 10.

Figure 5B:
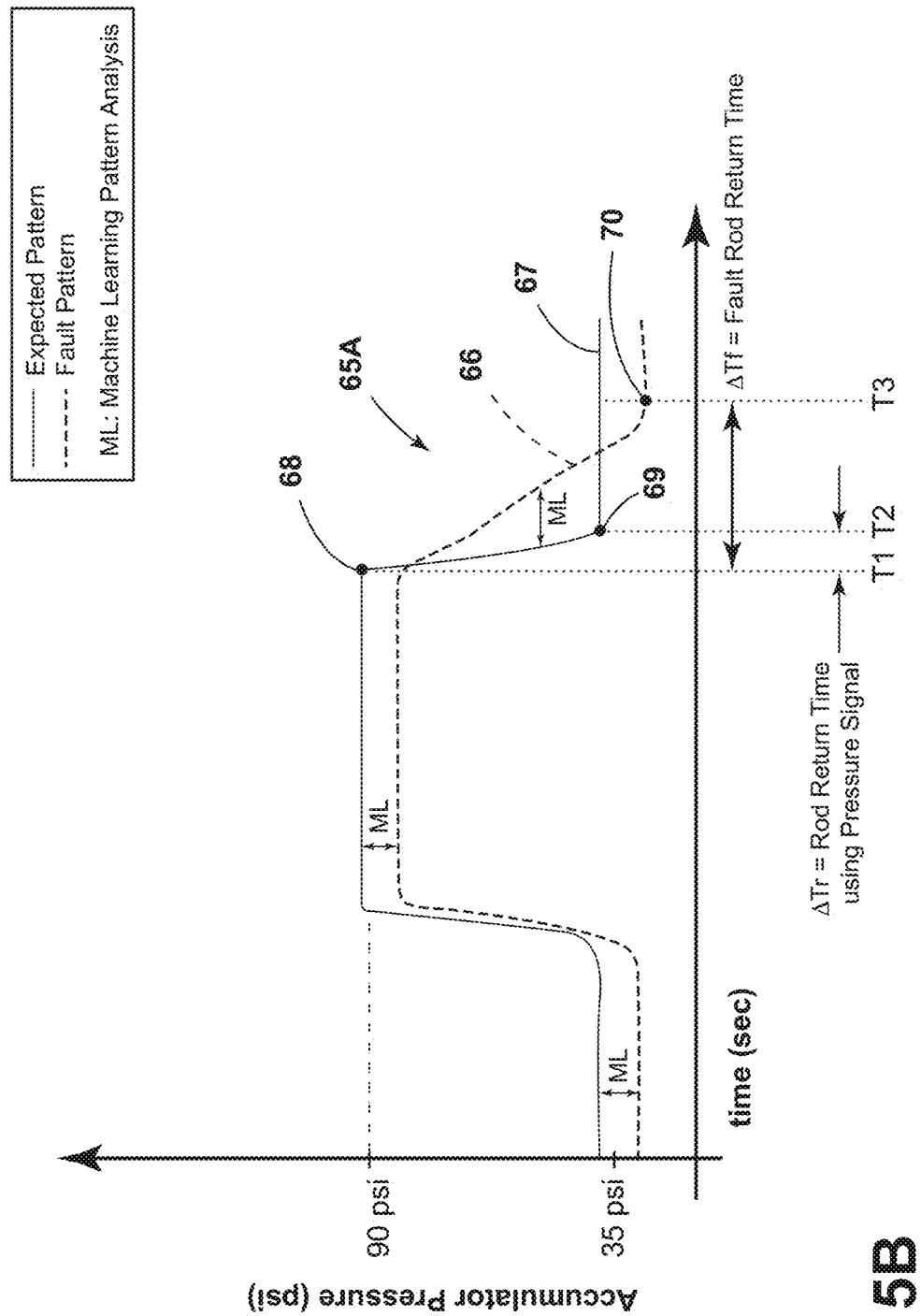
FIG. 5B is a graph showing Rod Return Time (RRT) calculation according to another aspect of the present disclosure.

With further reference to FIGS. 5A and 5B, measured pressure 66 may be utilized to calculate Rod Return Time (RRT). Specifically, measured pressure 66 may vary from an expected pressure data line 67. If the rod pressure follows the expected line 67, this generally indicates that the industrial shock 10 is operating properly, and the shock has not worn excessively or experienced significant damage. If the shock is operating properly, the measured (calculated) Rod Return Time (RRT) will be equal to $\Delta T_r$, which is the difference between the vertical lines $T_1$ and $T_2$. Line $T_1$ corresponds to a time at which the pressure begins to drop (i.e. point 68), and the time $T_2$ corresponds to the point 69 at which the pressure stops dropping and returns to a baseline pressure if the shock is operating properly. When first installed and operated, an industrial shock 10 will typically have a measured (calculated) RRT that is consistent with the expected RRT value $\Delta T_r$ (i.e., the measured (calculated) RRT generally follows line 67 between points 68 and 69). However, if the industrial shock 10 is worn, or experiencing other failure, the measured pressure 66 may deviate from the expected pressure 67, and the pressure may transition at a point 70 corresponding to a time $T_3$. In this example, the measured (calculated) RRT is equal to a Fault Rod Return Time (FRRT) $\Delta T_f$ comprising the difference between the times $T_1$ and $T_3$. The Fault Rod Return Time (FRRT) $\Delta T_f$ may comprise a failure criteria such that the system (e.g., controller 14 and/or other components) generates an alert or warning to display 15 (FIG. 2) or display 15A (FIG. 2A) if the measured (calculated) RRT is equal to or greater than the (FRRT) $\Delta T_f$. In the illustrated example, the Fault Rod Return Time (FRRT) $\Delta T_f$ is significantly greater than the expected Rod Return Time (RRT) $\Delta T_r$. The system may be configured to determine if the difference between the measured (calculated) RRT and the $\Delta T_f$ is large enough to meet predefined failure criteria (e.g. step 142, FIG. 3), and provide a warning or information to an operator. In general, the difference between measured (calculated) RRT and $\Delta T_f$ may be continuously calculated and updated over time as the industrial shock 10 cycles, and the changes in the difference between measured (calculated) RRT and $\Delta T_f$ may be utilized to predict shock failure.

With further reference to FIG. 5B, the system (e.g., controller 14 and/or other components) may also be configured to implement machine learning to recognize changes and/or patterns of change "ML" between measured and expected pressure (lines 66 and 67, respectively). In particular, the system may be configured to implement the machine learning processes described above in connection with FIGS. 3A and 3B to detect and/or predict failure of industrial shock 10. This machine learning process may be utilized in addition to predefined failure criteria. For example, the machine learning process may determine that a failure has occurred based on differences ML (FIG. 5B) even if the measured RRT is less than the Fault Rod Return Time $\Delta T_f$.

Figure 6A:
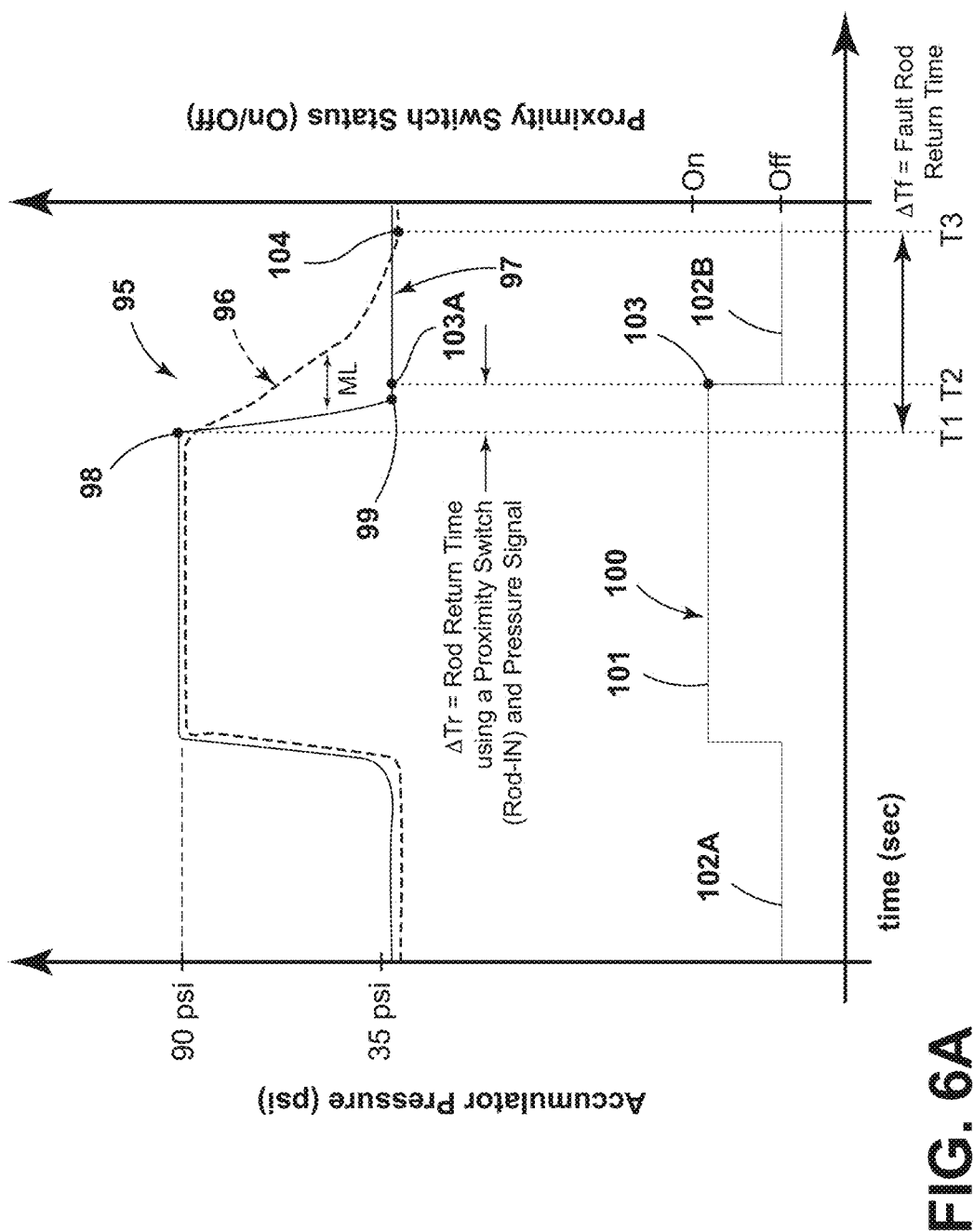
FIG. 6A is a graph showing Rod Return Time (RRT) calculation according to another aspect of the present disclosure.

With reference to FIG. 6A, a graph 95 includes a line 96 that is an example of a measured pressure, and a line 97 that is an example of an expected pressure signal from the sensors that are operably connected to the industrial shock 10. In general, line 96 of FIG. 6A may be similar to the line 66 of FIG. 5A and the line 97 of FIG. 6A may be similar to the line 67 of FIG. 5A. As the industrial shock 10 wears, the measured pressure 96 may vary from the expected pressure 97, and this difference "ML" may be recognized utilizing machine learning as described above. In the illustrated example, the expected pressure 97 transitions from high pressure to low pressure at points 98 and 99. Line 100 represents a signal from a proximity switch (Rod-OUT) having portions 102A and 102B corresponding to an "Off" signal, and a portion 101 corresponding to an "On" signal.

The pressure signal line 96 and/or pressure signal line 97 can be utilized in conjunction with the proximity switch signal 100 to determine Rod Return Time (RRT). In particular, the RRT $\Delta T_r$ can be calculated as the horizontal distance between the lines $T_1$ and $T_2$. The line $T_1$ corresponds to point 98 at which the accumulator pressure begins to drop, and the vertical line $T_2$ represents point 103 at which the proximity switch signal 100 shifts to "Off." In the example of FIG. 6A, the Fault Rod Return Time (FRRT) $\Delta T_f$ is the horizontal distance (i.e. difference) between the vertical lines $T_1$ and $T_3$. FRRT $\Delta T_f$ may comprise a predefined failure criteria, and the system may be configured to generate a warning signal if the measured RRT is equal to FRRT $\Delta T_f$ and/or if the measured RRT is sufficiently close to the FRRT $\Delta T_f$ failure criteria. The vertical line at $T_3$ intersects point 104 of measured pressure line 96. Point 104 is the point at which the measured pressure 96 transitions from a downward slope to a horizontal slope. It will be understood that lines 96 and 97 are examples, and the measured pressure 96 in a given shock may vary somewhat during operation, such that a "sharp" transition from decreasing pressure to horizontal pressure may not be readily apparent in all cases. Accordingly, the system may be configured to determine the slope of line 96 and determine the location of point 104 according to predefined criteria (e.g. if the slope of line 96 is zero or sufficiently small). Furthermore, the measured pressure line 96 may be smooth or curve fit to reduce variations to avoid incorrectly determining the location of point 104 based on small variations in measured pressure 96.

Figure 6B:
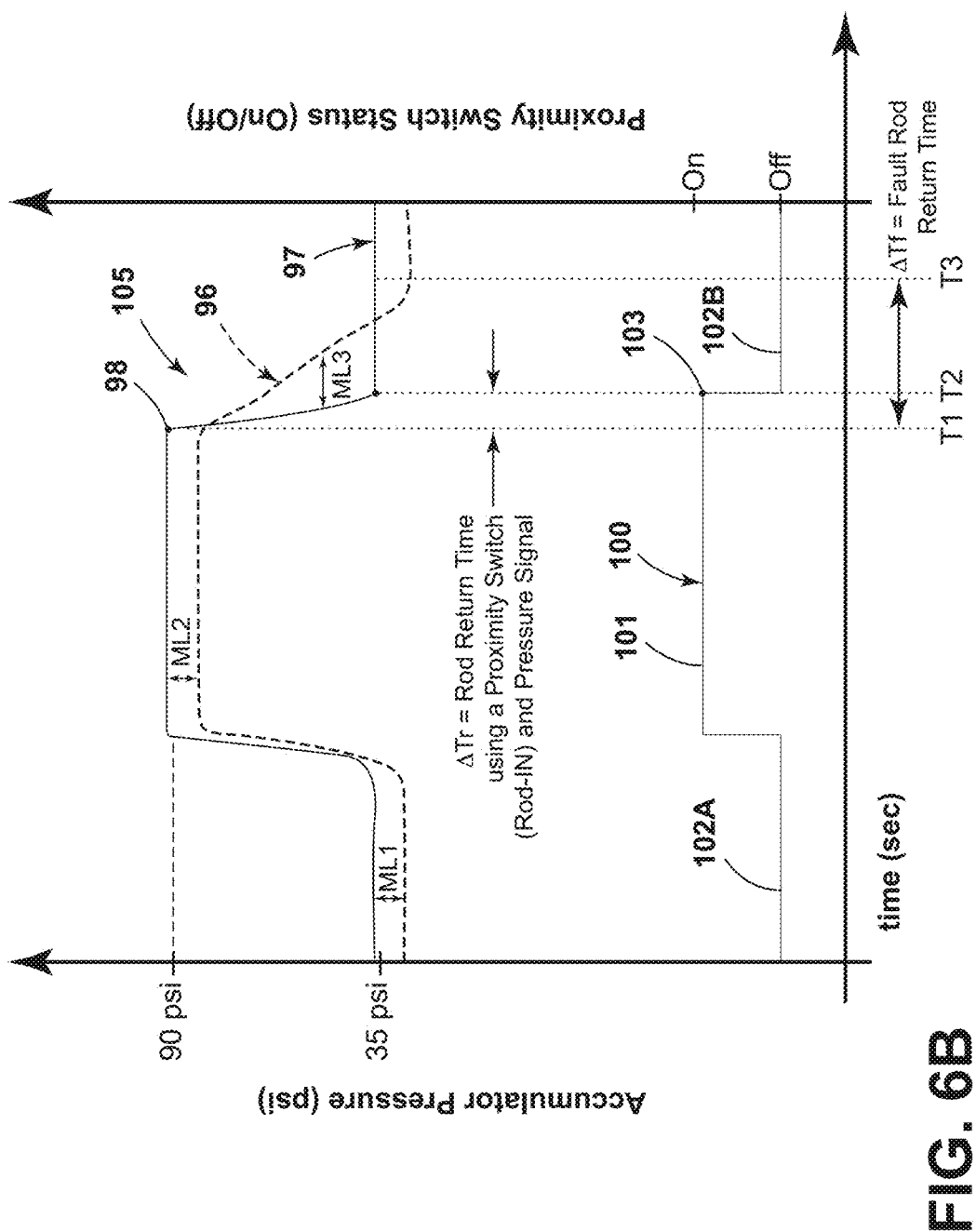
FIG. 6B is a graph showing Rod Return Time (RRT) calculation according to another aspect of the present disclosure.

With reference to FIG. 6B, a chart or graph 105 is somewhat similar to graph 95 of FIG. 6A. Graph 105 includes a measured pressure line 96, and an expected pressure line 97. Proximity switch line 100 corresponds to the "On" and "Off" states of a proximity switch. FIG. 6B may represent measurements for the same shock as FIG. 6A after the shock has experienced additional wear. In FIG. 6B, the measured pressure line 96 has further shifted relative to the expected pressure line 97, thereby forming three regions $ML_1$, $ML_2$, and $ML_3$ at which the measured pressure line 96 is spaced apart from the expected pressure line 97. The system may be configured to utilize the differences $ML_1$, $ML_2$, and $ML_3$ utilizing machine learning as discussed above in connection with FIGS. 3, 3A, and 3B to determine if failure has occurred or is predicted to occur. In FIG. 6B, the expected (non-fault) RRT $\Delta T_r$ is the difference between lines $T_1$ and $T_2$, and the Fault Rod Return Time FRRT $\Delta T_f$ is the difference between the lines $T_1$ and $T_3$. Thus, in the example of FIG. 6B, expected RRT and FRRT $\Delta T_f$ are determined in substantially the same manner as discussed above in connection with FIG. 6A. However, because one or more of lines $T_1$, $T_2$, and $T_3$ may shift, the numerical value of FRRT of FIG. 6B may not be equal to the value in FIG. 6A. It will be understood that the actual shapes of the lines 96, 97, and 100 for a given industrial shock 10 may have somewhat different shapes than the lines of FIGS. 6A and 6B. Furthermore, the changes in the shapes of the lines (e.g. measured pressure line 96) could vary in numerous ways as the industrial shock 10 is used, and FIGS. 6A and 6B merely illustrate one possible example. FRRT $\Delta T_f$ may comprise predefined failure criteria, and the measured FRRT $\Delta T_r$ may be compared to FRRT $\Delta T_f$ to determine if a failure has occurred or is predicted to occur.

It will be understood that the FRRT may be determined empirically by testing shocks to failure or near failure. Once the FRRT value is determined, it may be stored (programmed into) the system, and the system may repeatedly compare the measured RRT to the FRRT to determine if a failure has occurred.

Figure 7A:
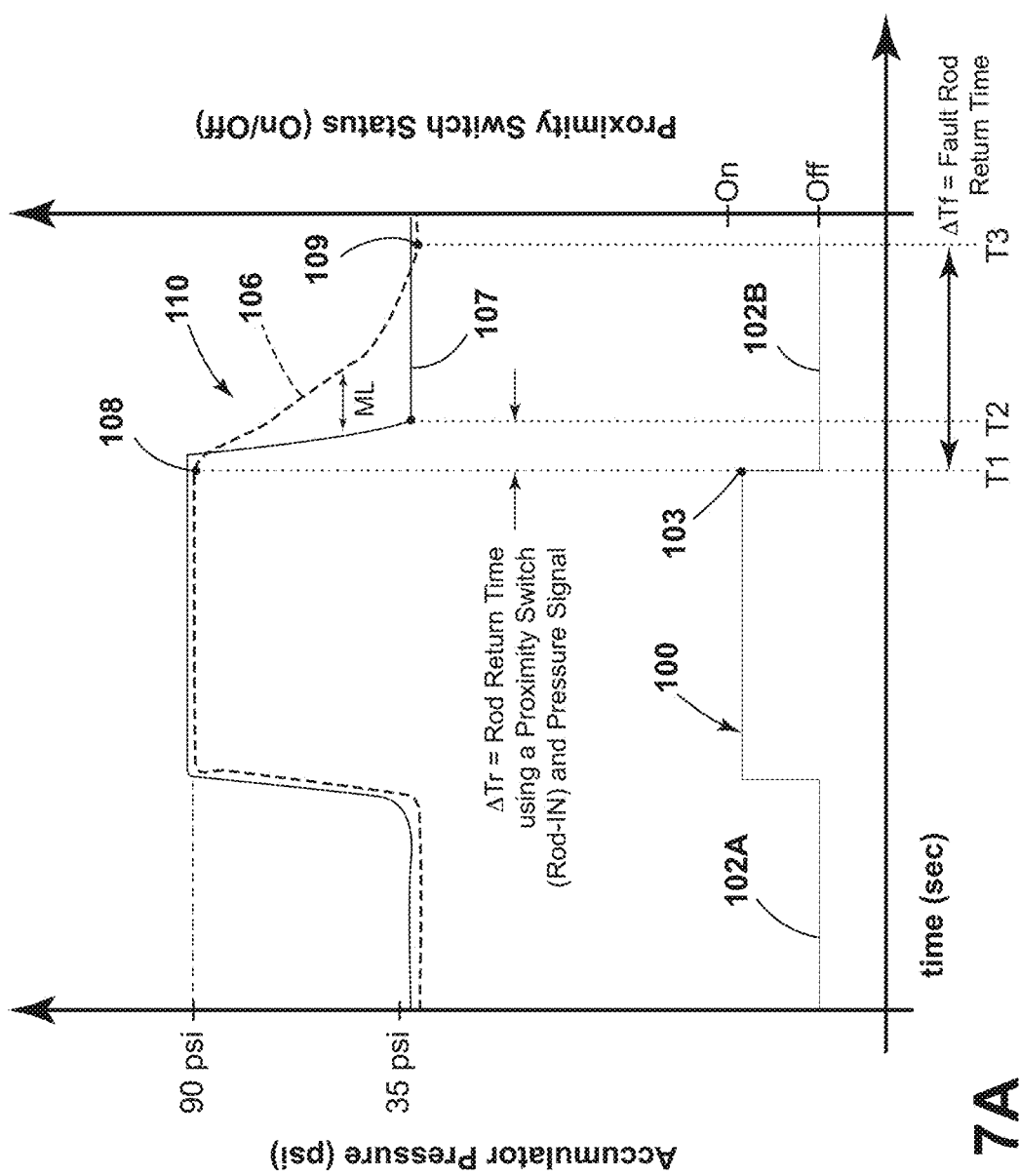
FIG. 7A is a graph showing Rod Return Time (RRT) calculation according to another aspect of the present disclosure.
Figure 7B:
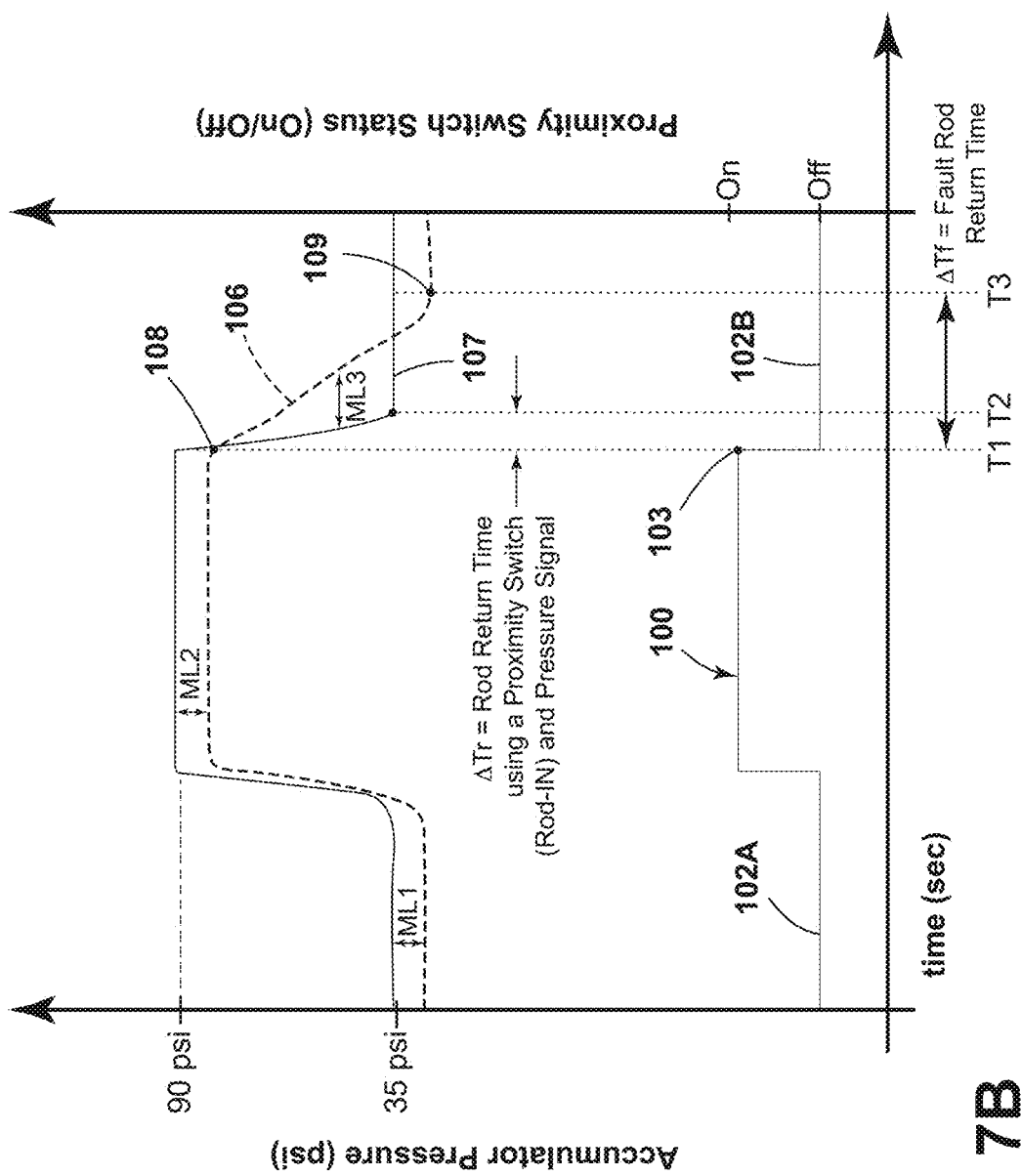
FIG. 7B is a graph showing Rod Return Time (RRT) calculation according to another aspect of the present disclosure.

With further reference to FIGS. 7A and 7B, the RRT $\Delta T_r$ may be determined by taking the difference between vertical lines $T_1$ and $T_2$, and the Fault Rod Return Time FRRT $\Delta T_f$ may be calculated by taking the difference between vertical lines $T_1$ and $T_3$. As noted above, the signal line 100 of FIGS. 6A and 6B corresponds to the "On" and "Off" states of a Rod-OUT proximity switch. In contrast, the line 100 of FIGS. 7A and 7B corresponds to the "On" and "Off" status of a Rod-IN proximity switch. Accordingly, the horizontal location of the point 103 of line 100, which corresponds to the change in state from "On" to "Off" of the proximity switch is shifted to the left in FIGS. 7A and 7B relative to the position of point 103 in FIGS. 6A and 6B. In general, the signal 100 transitions from "On" to "Off" in FIGS. 7A and 7B as the rod begins to shift from the "On" position. The differences ML, $ML_1$, $ML_2$, and $ML_3$ between the measured pressure 106 and expected pressure 107 in FIGS. 7A and 7B may be utilized by the machine learning process of FIGS. 3, 3A and 3B to identify variations in the measured pressure, and/or wear or other malfunctions in industrial shock 10, and generate warning and/or failure signals to a display 15 (FIG. 2) or 15A (FIG. 2A). It will be understood that the differences ML, $ML_1$, $ML_2$, $ML_3$, etc. may be utilized by the system (e.g., controller 14) to detect and/or predict failure and/or wear of the shock alone and/or in combination with changes in measured TTS and/or changes in RRT and/or unexpected measured TTS and/or RRT.

Figure 8:
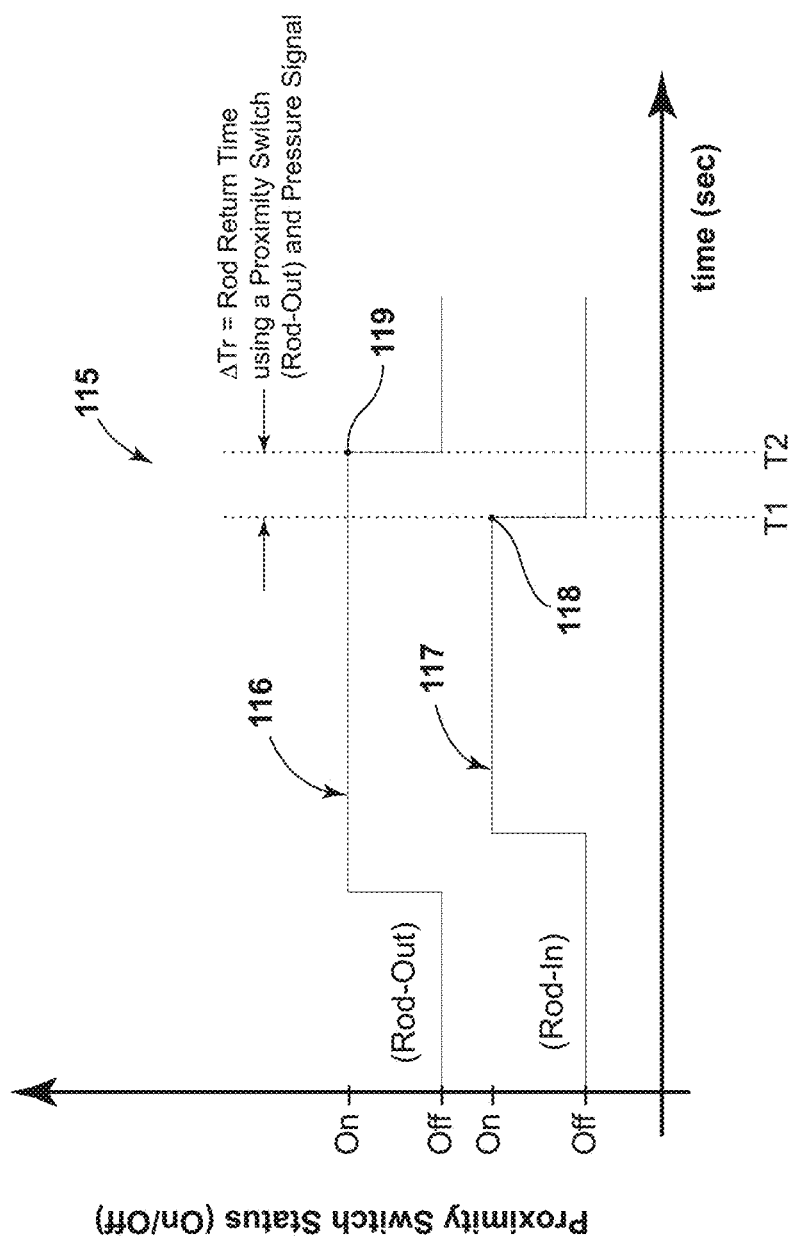
FIG. 8 is a graph showing Rod Return Time (RRT) calculation according to another aspect of the present disclosure.

With further reference to FIG. 8, a chart 115 includes a signal line 116 of a Rod-OUT proximity switch, and a line 117 corresponding to the status of a Rod-IN limit switch. FIG. 8 corresponds to a configuration of an industrial shock 10 having both Rod-IN and Rod-OUT proximity switches. The Rod Return Time $\Delta T_r$ may be determined by taking the difference between vertical lines $T_1$ and $T_2$. Vertical $T_1$ corresponds to point 118 at which the Rod-IN status line 117 transitions from "On" to "Off", and line $T_2$ corresponds to point 119. Point 119 is the point at which the Rod-OUT status 116 transitions from "On" to "Off". Variations in the RRT (e.g., increases and/or decreases over time when repeatedly subjected to the same force) may be utilized by the machine learning processes to predict failure and/or detect malfunctions of industrial shock 10.

The system (e.g., computer device or controller 14) may be configured to provide information regarding the number of cycles the industrial shock absorber 10 has experienced based on information calculated from the piston rod extension state and/or the pressure during each impact on the industrial shock absorber 10. The system (e.g., computing device or controller 14) may be configured to combine data from the proximity switches with the pressure signal to calculate the Time-Through-Stroke (TTS) as described above in connection with FIGS. 4A-4D.

One or more of the Rod Return Time (RRT) determinations of FIGS. 5A-8 may also be utilized to determine the end-of-life of industrial shock absorber 10 based on one or more of the number of cycles, the TTS, the RRT, and the operating temperature of the industrial shock absorber 10. The system (e.g., computing device 14 of ground station 16; FIG. 1) may be configured to perform edge computing on signals from each unique sensor over a period of time and compare the values with historical data. The system (e.g., computing device 14 of ground station 16; FIG. 1) may be configured to condition the values and profile the failure type based on the collected sensor readings. Based on the failure profile, a notification may be sent to the operators of the system or to a central (e.g. remote) engineering facility for any actions that may need to be performed. The ground control station 16 may be configured to provide a live relay of the performance characteristics of one or more selected shock absorbers 10 displayed in a dashboard view (e.g. FIGS. 2 and 2A) to the operators. The system may also provide information concerning the battery status within the sensor or sensors as discussed above in connection with FIG. 2A, and notify the operators whenever battery replacement is required.

The system offers the possibility for the performance values to be calibrated by engineers or other technical personnel so that the algorithms can be reused for handling specific failure detection based on the specific requirements for a particular application of the industrial shock 10. For example, the pressure value for a system warning could be adjusted to a specific application. The system may be configured to offer functionality where platform updates in the ground station software can be flashed from the cloud using Flash Over the Air (FOTA) protocol. The collected data sets from each digital assert may be uploaded to the cloud/server space and users may compare the characteristic values of the industrial shock absorber 10 from the day of origination.

The system (e.g., computing device 14 of ground station 16; FIG. 1) may be configured to immediately detect faults and/or failures of industrial shock 10 and communicate them to one or more operators. The system may immediately notify a smartphone, smart watch, send emails, send phone messages (SMS), etc. The system may offer the functionality of a cycle counter based on pressure data during cycles of shock activation. The system may offer the functionality of a cycle counter based on the rod position state using a proximity switch, which may be wired or wireless. The system (e.g., computing device 14 of ground station 16; FIG. 1) may be configured to determine TTS using only a pressure signal. The system (e.g., computing device 14 of ground station 16; FIG. 1) may be configured to combine data from a proximity switch with a pressure signal to calculate TTS based on the approaches discussed above in connection with one or more of FIGS. 4A-4D.

The system (e.g., computing device 14 of ground station 16; FIG. 1) may be configured to utilize the data of two proximity switches (Rod-OUT and Rod-IN) to calculate TTS as discussed above in connection with FIG. 4A. The system (e.g., computing device 14 of ground station 16; FIG. 1) may be configured to monitor TTS and provide a failure notification when the measured and/or calculated values fall outside of normal parameters as shown in one or more of FIGS. 4A-4D.

The system (e.g., computing device 14 of ground station 16; FIG. 1) may be configured to determine RRT using only the pressure signal as shown in FIGS. 5A and 5B. The system (e.g., computing device 14 of ground station 16; FIG. 1) may be configured to combine data from one proximity switch with the pressure signal to calculate RRT as described in more detail above in connection with FIGS. 6A, 6B, 7A, and 7B. The system (e.g., computing device 14 of ground station 16; FIG. 1) may also be configured to combine data from two proximity switches to calculate RRT as described above in connection with FIG. 8.

The system (e.g., computing device 14 of ground station 16; FIG. 1) may be configured to monitor RRT and provide failure notification when the measured and/or calculated values fall outside of the normal (expected) parameters as shown in one or more of FIGS. 5A-8. The system (e.g., computing device 14 of ground station 16; FIG. 1) may also offer functionality to predict the shock absorber end-of-life (EOL) based on the number of cycles and operating conditions. The system (e.g., computing device 14 of ground station 16; FIG. 1) may be configured to use the TTS parameters to detect shock absorber state of health, which may be used in an EOL prediction model. The system (e.g., computing device 14 of ground station 16; FIG. 1) may be configured to record the history of some or all parameters to facilitate detection of shock absorber deterioration using predefined criteria.

The system (e.g., computing device 14 of ground station 16; FIG. 1) may be configured to perform machine learning on the real-time data from the industrial shock absorber 10 with a focus on deep learning. It compares this data with historical data that is either programmed into the base data or learned during function of the industrial shock absorber 10. The machine learning algorithms can then identify anomalies, outliers, and predict unique failures of the industrial shock absorber 10 by comparing the real-time data with patterns from the historical data or models.

The system (e.g., computing device 14 of ground station 16; FIG. 1) may be configured to notify operators when deviations from the predicted outcome occur, and provide additional information concerning the possibility of fault or failures in the industrial shock absorber 10 which may or may not identify the time of system installation and/or assembly.

The system (e.g., computing device 14 of ground station 16; FIG. 1) may be configured to detect failures that occur, and may communicate the failures immediately so that the failures can be addressed as rapidly as possible to prevent further damage and/or to improve safety. Eliminating or reducing the costs resulting from further damage may provide a significant improvement compared to existing systems. The system (e.g., computing device 14 of ground station 16; FIG. 1) of the present disclosure may be configured to predict shock absorber EOL to provide for optimal preventative maintenance in manufacturing or other environments to maximize up-time and minimize costs. The system (e.g., computing device 14 of ground station 16; FIG. 1) may also be configured to predict earlier than normal failures and permit for preemptive measures to avoid damage to equipment or other items.

The system may be configured to directly measure TTS and/or RRT using two proximity switches including a Rod-OUT switch and a Rod-IN switch. The system (e.g., computing device 14 of ground station 16; FIG. 1) may be configured to calculate TTS and RRT with only the pressure signal. Alternatively, the system (e.g., computing device 14 of ground station 16; FIG. 1) may be configured to calculate TTS and RRT utilizing a combination of one rod proximity switch status with pressure data. The system (e.g., computing device 14 of ground station 16; FIG. 1) may be configured to perform notifications in the event instantaneously TTS or RRT failures occur. The TTS and RRT failures may be determined by the system (e.g., computing device 14 of ground station 16; FIG. 1) by comparing current TTS and/or RRT failures to expected values and/or historical TTS and/or RRT values measured by the system.

The system (e.g., computing device 14 of ground station 16; FIG. 1) may be configured to perform historical analysis and machine learning on the real-time RRT to predict the present or future probability of failure. The TTS and RRT patterns may be utilized by the system (e.g., computing device 14 of ground station 16; FIG. 1) to predict shock absorber EOL. The system (e.g., computing device 14 of ground station 16; FIG. 1) may include machine learning algorithms deployed within the edge computing device which perform deep learning of the shock absorber during its operation. The machine learning algorithms may be configured to study anomalies, outlier conditions, and predict outcomes by comparing the real-time data with patterns from the historical model. Operators may be notified of deviations from the predicted outcome, and the operators may be provided with additional information concerning the possibility of faults or failures in the industrial shock absorber 10 which may or may not have been identified at the time of system assembly and/or installation.

The system and method of the present disclosure may be utilized to predict normal shock absorber end-of-life to offer optimal preventive maintenance in manufacturing environments to maximize up-time and minimize cost. It may also be configured to predict earlier than normal failures and allow for preemptive measures to avoid damage. The system may be configured to detect failures that occur and to communicate the failures immediately so that failures can be addressed quickly to prevent further damage and to include safety. In this way, the system may provide significant cost savings.

The system may include a ground control unit that has pre-loaded characteristic curves for failure of signatures. Based on raw data from the sensors, the ground controlling unit may compare peak signals and pattern analysis of raw data with the built in characteristic curve to identify patterns and predict failure.

The invention claimed is:

1. An industrial shock absorber system, comprising:
an industrial shock absorber having a body and a force-receiving member movably connected to the body whereby a force applied to the force-receiving member causes movement of the force-receiving member relative to the body from an extended position to a retracted position causing movement of a working fluid whereby the working fluid resists movement of the force-receiving member as the force-receiving member moves from the extended position to a retracted position when a force is applied to the force-receiving member;
a resilient member biasing the force-receiving member towards the extended position such that the force-receiving member returns to the extended position from the retracted position if a force applied to the force-receiving member is released to define a Rod Return Time (RRT);
a sensor configured to generate measured sensor data corresponding to at least one of a pressure of the working fluid, a temperature of the working fluid, and rod position data corresponding to a position of the force-receiving member relative to the body; and
at least one computing device operably coupled to the sensor, wherein the computing device is configured to determine at least one of Time-Through-Stroke (TTS) and RRT based on the sensor data and to compare measured TTS and/or measured RRT to expected and/or historical TTS and/or RRT data to detect and/or predict failure of the industrial shock absorber.

2. The industrial shock absorber system of claim 1, wherein:
the system is configured to perform machine learning on real-time sensor data and to compare the real-time sensor data with historical sensor data to identify anomalies and/or outliers and/or to predict shock absorber failure by comparing the real-time sensor data with patterns from historical data and/or models.

3. The industrial shock absorber system of claim 1, wherein:
the measured sensor data forms a pattern;
the system stores sensor data for a plurality of cycles; and
the computing device is configured to compare stored sensor data to measured sensor data and to utilize machine learning to detect and/or predict failure of the industrial shock absorber based, at least in part, on changes in the patterns formed by the sensor data over time.

4. The industrial shock absorber system of claim 1, wherein:
the system is configured to immediately detect faults and/or failures by comparing measured sensor data to expected sensor data and to communicate the faults and/or failures to an operator of the system.

5. The industrial shock absorber system of claim 1, wherein:
the force-receiving member defines a cycle each time the force-receiving member moves from an extended position to a retracted position followed by movement of the force-receiving member from the retracted position to the extended position; and
the computing device is configured to determine a number of cycles that have occurred during a predefined time interval utilizing pressure data from the sensor.

6. The industrial shock absorber system of claim 1, wherein:
the computing device is configured to determine TTS and/or RRT using only pressure data.

7. The industrial shock absorber system of claim 1, wherein:
the computing device is configured to determine TTS and/or RRT using rod position data and measured pressure data.

8. The industrial shock absorber system of claim 1, wherein:
the system includes a Rod-IN proximity switch that generates a signal when the force-receiving member is in the retracted position and a Rod-OUT proximity switch that generates a signal when the force-receiving member is in the extended position; and
the computing device is configured to determine TTS and/or RRT using data from the Rod-IN and Rod-OUT proximity switches.

9. The industrial shock absorber system of claim 1, wherein:
the system is configured to monitor TTS and/or RRT and to provide a failure notification if the magnitude of the TTS and/or RRT is not within a predefined acceptable range.

10. The industrial shock absorber system of claim 1, wherein:
the system is configured to provide a notification if the system determines that deviations from a predicted outcome have occurred.

11. The industrial shock absorber system of claim 1, wherein:
the industrial shock absorber includes a main internal chamber in the body and a secondary chamber in an external accumulator that is fluidly connected to the main internal chamber;
the sensor comprises a pressure sensor that is configured to measure pressure of working fluid in the secondary chamber;
during a cycle, the pressure of working fluid in the secondary chamber has an initial pressure, increases to a maximum pressure, and decreases to a final pressure that is substantially equal to the initial pressure to define a pressure pattern; and
the computing device is configured to repeatedly store pressure data corresponding to pressure of working fluid in the secondary chamber measured by the sensor during a plurality of cycles and determine if changes in the pressure patterns indicate that a failure has occurred and/or is likely to occur within a predefined number of cycles.

12. The industrial shock absorber system of claim 1, wherein:
the measured sensor data corresponds solely to a pressure of the working fluid.

13. The industrial shock absorber system of claim 1, wherein:
the measured sensor data corresponds solely to a temperature of the working fluid.

14. The industrial shock absorber system of claim 1, wherein:
the measured sensor data corresponds solely to rod position data corresponding to a position of the force-receiving member relative to the body.

15. A method of monitoring operation of an industrial shock absorber having a body and a force-receiving member movably connected to the body whereby a force applied to the force-receiving member causes movement of the force-receiving member relative to the body from an extended position to a retracted position and a resilient member biasing the force-receiving member towards the extended position such that the force-receiving member returns to the extended position from the retracted position if a force applied to the force-receiving member is released when the industrial shock absorber is installed in machinery having a moving part, the method comprising:
repeatedly measuring an operating parameter of an industrial shock absorber using a sensor as the industrial shock absorber is repeatedly cycled by repeatedly applying a force to the force-receiving member by causing the moving part of the machinery to move towards the force-receiving member from a first position in which the moving part is spaced apart from the force-receiving member while the force-receiving member is in the extended position into contact with the force-receiving member to move the force-receiving member from the extended position to the retracted position, followed by movement of the moving part away from the force-receiving member to the first position to form a gap between the moving part and the force-receiving member after the resilient member causes the force-receiving member to return to the extended position, whereby the sensor generates operating parameter data;
storing operating parameter data for a plurality of cycles to form historical operating parameter data; and
utilizing a computing device to perform machine learning on the operating parameter data for a plurality of cycles, and to compare more recent operating parameter data to the historical operating parameter data, whereby the computing device predicts failure of the industrial shock absorber based on changes in the operating parameter data over time.

16. The method of claim 15, wherein:
the force-receiving member comprises a piston rod that moves relative to the body between extended and retracted positions, the piston rod acting on a working liquid that is pressurized as the piston rod moves from the extended position to the retracted position to resist movement of the piston rod from the extended position to the retracted position, wherein the resilient member comprises a spring biasing the piston rod towards the extended position, and wherein the operating parameter data includes pressure of the working liquid as the piston rod moves from the extended position to the retracted position; and including:
using the computing device to detect changes in patterns formed by the pressure of the working liquid as the piston rod moves from the extended position to the retracted position over time and to predict failure of the industrial shock absorber if the cyclical force is repeatedly applied to the industrial shock absorber.

17. The method of claim 16, wherein:
the pressure of the working liquid as the piston rod moves from the extended position to the retracted position increases from a baseline pressure to a peak pressure, then decreases from the peak pressure back to the baseline pressure; and including:
causing the computing device to predict and/or detect a failure of the industrial shock absorber based on changes over time in at least one of the baseline pressure, the peak pressure, and changes in pressure between the baseline pressure and the peak pressure.

18. The method of claim 15, wherein:
the historical operating parameter data for each cycle forms a pattern; the patterns change over time; and including:
causing the computing device to generate a warning if the computing device determines that changes in the patterns indicate that the industrial shock absorber has failed or that the industrial shock absorber will fail if the cyclical load continues to be applied.

19. The method of claim 15, including:
providing expected operating parameter data to the computer device; and
causing the computing device to generate a failure warning if measured operating parameter data does not meet predefined matching criteria when compared to the expected operating parameter data.

20. The method of claim 15, including:
mounting the body of the industrial shock absorber to a stationary base of machinery disposed in a facility selected from the group consisting of a steel mill, a lumber mill, a shipping yard, a warehouse, a stacker space, an automated storage and retrieval system, and a production facility, and wherein the stationary base remains stationary while the moving part moves towards the force-receiving member and away from the force-receiving member.

21. A method of monitoring operation of an industrial shock absorber, the method comprising:
repeatedly measuring an operating parameter of an industrial shock absorber using a sensor as the industrial shock absorber is repeatedly cycled by repeatedly applying a cyclical force having a substantially uniform magnitude each time the force is applied to the industrial shock absorber, whereby the sensor generates operating parameter data;
storing operating parameter data for a plurality of cycles to form historical operating parameter data; and
utilizing a computing device to perform machine learning on the operating parameter data for a plurality of cycles, and to compare more recent operating parameter data to the historical operating parameter data, whereby the computing device predicts failure of the industrial shock absorber based on changes in the operating parameter data over time;
wherein the industrial shock absorber includes a body and a piston rod that moves relative to the body between extended and retracted positions, the piston rod acting on a working fluid that is pressurized as the piston rod moves from the extended position to the retracted position to resist movement of the piston rod from the extended position to the retracted position, the industrial shock absorber further including a spring biasing the piston rod towards the extended position and causes the piston rod to move from the retracted position to the extended position, and wherein the operating parameter data includes pressure of the working fluid as the piston rod moves from the extended position to the retracted position; and including:
and wherein the pressure of the working fluid as the piston rod moves from the extended position to the retracted position increases from a baseline pressure to a peak pressure, then decreases from the peak pressure back to the baseline pressure; and including:
using the computing device to detect changes in patterns formed by the pressure of the working fluid as the piston rod moves from the extended position to the retracted position over time and to predict failure of the industrial shock absorber if the cyclical force is repeatedly applied to the industrial shock absorber;
causing the computing device to predict and/or detect a failure of the industrial shock absorber based on changes over time in at least one of the baseline pressure, the peak pressure, and changes in pressure between the baseline pressure and the peak pressure;
causing the computing device to repeatedly determine at least one of a Time-Through-Stroke (TTS) comprising a time required for the piston rod to move from the extended position to the retracted position when the cyclical force is applied, and a Rod Return Time (RRT) comprising a time required for the piston rod to move from the retracted position to the extended position after the cyclical force is removed; and
causing the computing device to detect failure of the industrial shock and/or predict failure of the industrial shock based on changes in TTS and/or RRT over time.

22. The method of claim 21, wherein:
at least one of the TTS and the RRT are determined using measured pressure data.

23. The method of claim 21, wherein:
at least one of the TTS and the RRT are determined using measured pressure data; and
a sensor that is configured to detect at least one of a position and an acceleration of the piston rod relative to the body.

24. A method of monitoring operation of an industrial shock absorber, the method comprising:
repeatedly measuring an operating parameter of an industrial shock absorber using a sensor as the industrial shock absorber is repeatedly cycled by repeatedly applying a cyclical force having a substantially uniform magnitude each time the force is applied to the industrial shock absorber, whereby the sensor generates operating parameter data;
storing operating parameter data for a plurality of cycles to form historical operating parameter data; and
utilizing a computing device to perform machine learning on the operating parameter data for a plurality of cycles, and to compare more recent operating parameter data to the historical operating parameter data, whereby the computing device predicts failure of the industrial shock absorber based on changes in the operating parameter data over time;
wherein the industrial shock absorber includes a body and a piston rod that moves relative to the body between extended and retracted positions, the piston rod acting on a working fluid that is pressurized as the piston rod moves from the extended position to the retracted position to resist movement of the piston rod from the extended position to the retracted position, the industrial shock absorber further including a spring biasing the piston rod towards the extended position and causes the piston rod to move from the retracted position to the extended position, and wherein the operating parameter data includes pressure of the working fluid as the piston rod moves from the extended position to the retracted position; wherein the pressure of the working fluid as the piston rod moves from the extended position to the retracted position increases from a baseline pressure to a peak pressure, then decreases from the peak pressure back to the baseline pressure; and including:

using the computing device to detect changes in patterns formed by the pressure of the working fluid as the piston rod moves from the extended position to the retracted position over time and to predict failure of the industrial shock absorber if the cyclical force is repeatedly applied to the industrial shock absorber;

causing the computing device to predict and/or detect a failure of the industrial shock absorber based on changes over time in at least one of the baseline pressure, the peak pressure, and changes in pressure between the baseline pressure and the peak pressure;

wherein the pressure of the working fluid as the piston rod moves from the extended position to the retracted position comprises a fluid pressure in an external accumulator of the industrial shock absorber;

wherein during each cycle prior to failure, the peak pressure of the pressure of working fluid in the second chamber is substantially constant for a period of time, and then begins to drop from the peak pressure at a first transition point and continues to drop until the pressure of the working fluid as the piston rod moves from the extended position to the retracted position reaches a second transition point at which the pressure of the working fluid as the piston rod moves from the extended position to the retracted position substantially returns to the baseline pressure; and wherein an amount of time between the first and second transition points increases over time; and including:

causing the computing device to detect and/or predict failure of the industrial shock absorber based, at least in part, on an increase in the amount of time between the first and second transition points.

* * * * *